United States Patent
Nakagawa et al.

(10) Patent No.: US 8,347,122 B2
(45) Date of Patent: Jan. 1, 2013

(54) APPARATUS AND METHOD FOR CONTROLLING A DRIVE STATUS OF A DEVICE BASED ON POWER SOURCE INFORMATION

(75) Inventors: Noriaki Nakagawa, Tokyo (JP); Junichi Hoashi, Kanagawa (JP); Hidetoshi Shimada, Kanagawa (JP); Shogo Kurihara, Kanagawa (JP); Tomoyuki Kitagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 488 days.

(21) Appl. No.: 12/631,149

(22) Filed: Dec. 4, 2009

(65) Prior Publication Data

US 2010/0169676 A1 Jul. 1, 2010

(30) Foreign Application Priority Data

Dec. 26, 2008 (JP) .................... 2008-335251

(51) Int. Cl.
*G06F 1/00* (2006.01)
*H02J 7/00* (2006.01)
(52) U.S. Cl. ........................ 713/300; 320/135
(58) Field of Classification Search .................... None
See application file for complete search history.

(56) References Cited

U.S. PATENT DOCUMENTS

| 7,024,567 | B2 * | 4/2006 | Kim et al. ................. 713/300 |
| 7,069,463 | B2 * | 6/2006 | Oh ................................. 713/503 |
| 7,647,516 | B2 * | 1/2010 | Ranganathan et al. ........ 713/320 |
| 2005/0136320 | A1 | 6/2005 | Yajima et al. |
| 2005/0210304 | A1 * | 9/2005 | Hartung et al. ............... 713/320 |
| 2006/0035527 | A1 * | 2/2006 | Numano ........................ 439/668 |

FOREIGN PATENT DOCUMENTS

JP  2005-165545  6/2005

* cited by examiner

*Primary Examiner* — Ji H Bae
(74) *Attorney, Agent, or Firm* — Oblon, Spivak, McClelland, Maier & Neustadt, L.L.P.

(57) ABSTRACT

There is provided an information processing apparatus including an internal power source that supplies power, a power source information acquiring unit that acquires, from the internal power source, power source information relating to supply of the power in the internal power source, a drive status setting unit that determines power supply capability of the internal power source based on the power source information and sets setting information to define a drive status of a device in accordance with a determination result, and a device control unit that controls the drive status of one or more control subject device, based on the setting information.

9 Claims, 12 Drawing Sheets

FIG. 1

| Command |
|---|
| Battery Status |
| BatteryTemp |
| Voltage |
| Current |
| Battery Status |
| BatteryTemp |
| Voltage |
| Current |
| Battery Status |
| BatteryTemp |
| Voltage |
| Current |
| Battery Status |
| BatteryTemp |
| Voltage |
| Current |
| Battery Status |
| BatteryTemp |
| Voltage |
| Current |
| Battery Status |
| BatteryTemp |
| Voltage |
| Current |
| ⋮ |

- Rows 1–4: INFORMATION ACQUISITION REQUEST CORRESPONDING TO POWER SOURCE INFORMATION 1
- Rows 5–8: INFORMATION ACQUISITION REQUEST CORRESPONDING TO POWER SOURCE INFORMATION 2
- Rows 9–12: INFORMATION ACQUISITION REQUEST CORRESPONDING TO POWER SOURCE INFORMATION 3
- Rows 13–16: INFORMATION ACQUISITION REQUEST CORRESPONDING TO POWER SOURCE INFORMATION 4
- Rows 17–20: INFORMATION ACQUISITION REQUEST CORRESPONDING TO POWER SOURCE INFORMATION 5
- Rows 21–24: INFORMATION ACQUISITION REQUEST CORRESPONDING TO POWER SOURCE INFORMATION 6

FIG. 2

| | A | | B | C | | E |
|---|---|---|---|---|---|---|
| | Active condition | | | | | |
| Temperature | T≦5 DEGREES | | — | T≧50[W] | | T≧60 DEGREES |
| Power consumption (Voltage & Ampere) | — | | P≧70[W] | P≧60[W] | D | — |
| Function Status | | | | Active | | |

FIG. 3

| Temperature | T≦5 DEGREES | 5 DEGREES<T<60 DEGREES | T≧50 DEGREES | T≧60 DEGREES |
|---|---|---|---|---|
| Battery Voltage | — | V>10[V] | — | — |
| Power consumption (Voltage & Ampere) | — | P<50[W] | — | — |
| Function Status | Active | Inactive | Active | Active |

F / G (Inactive condition) / J / K ; H I

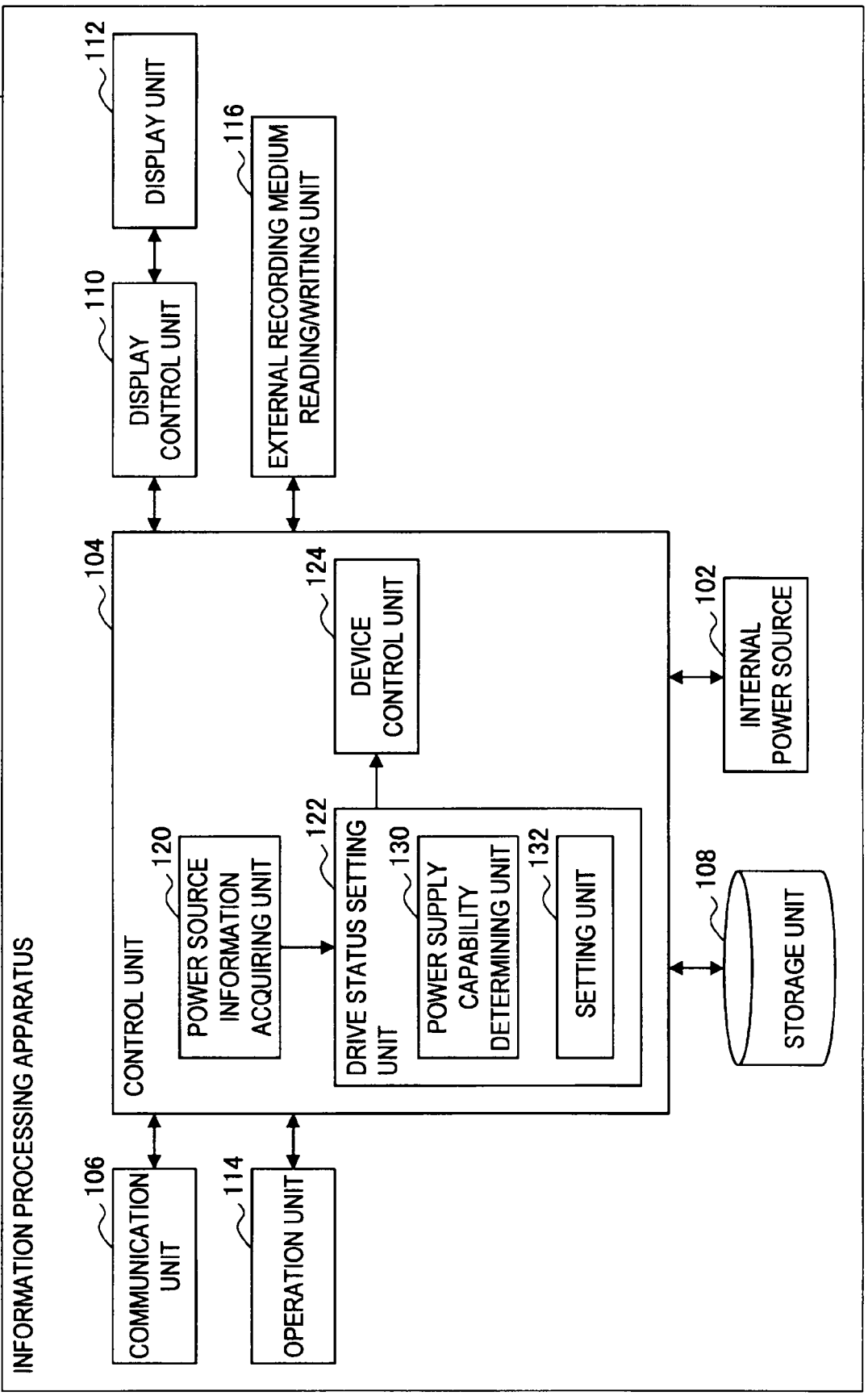

APPARATUS AND METHOD FOR CONTROLLING A DRIVE STATUS OF A DEVICE BASED ON POWER SOURCE INFORMATION

BACKGROUND OF THE INVENTION

1. Field of the Invention

The present invention relates to an information processing apparatus and a device control method.

2. Description of the Related Art

In recent years, an information processing apparatus including an internal power source such as a battery, and capable of both driving by the relevant internal power source and driving by an external power source such as an AC (Alternating Current) power source, for example, a laptop PC (Personal Computer) or the like, has been widespread.

Moreover, in recent years, high performance of an information processing apparatus has been advanced, and in some of the foregoing information processing apparatuses, power consumption in the information processing apparatus may exceed supply power that the internal power supply can supply. Here, when in the information processing apparatus, the power consumption exceeds the supply power, there is a possibility that an event that disturbs normal operation, for example, unintended disconnection of the power source or the like, occurs in the information processing apparatus.

In these situations, a technique of performing drive control of a device included by the information processing apparatus based on information obtained from the internal power source has been developed. As a technique in which drive control of an equipment body is performed based on information acquired from a battery pack prevents the power consumption from exceeding the supply power of the battery pack, for example, Japanese Patent Application Laid-Open No. 2005-165545 is cited.

SUMMARY OF THE INVENTION

In a related art of performing drive control of the device included by the information processing apparatus based on the information obtained from the internal power source (hereinafter, referred to as a "related art"), the drive control of the device is performed based on the information acquired from the internal power source. More specifically, the information processing apparatus to which the related art is applied (hereinafter, referred to as a "related-art information processing apparatus) performs the drive control of the device by changing, based on the information acquired from the internal power source, an operating frequency that operates the equipment body to a value in accordance with the information. That is, in the related art, when the power consumption is likely to exceed the supply power, a function of the related-art information processing apparatus is limited by design to reduce the power consumption, and thereby the device is controlled so that the power consumption will be kept within the supply power. Thus, an effect that the application of the related art prevents the power consumption in the related-art information processing apparatus from exceeding the supply power of the internal power source is expected in the related-art information processing apparatus.

While there is a technique of obtaining normal operation of the information processing apparatus even if the function is limited, there exists a need of users for higher functionality in the case of driving by the internal power source to the information processing apparatus including the internal power source, for example, a laptop PC or the like. In the related art, however, the operating frequency is simply changed in accordance with the information transmitted from the internal power source. Accordingly, when the related art is used, functional enhancement when the information processing apparatus is driven by the internal power source will not be possible to be expected.

In light of the foregoing, it is desirable to provide a novel and improved information processing apparatus and device control method, which enable a good balance between stable driving and functional enhancement in the case of driving by power supplied from an internal power source to be achieved.

According to an embodiment of the present invention, there is provided an information processing apparatus including an internal power source that supplies power, and also including a power source information acquiring unit that acquires, from the internal power source, power source information relating to supply of the power in the internal power source. The information processing apparatus also includes a drive status setting unit that determines power supply capability of the internal power source based on the power source information, and sets setting information to define a drive status of a device in accordance with a determination result. The information processing apparatus also includes a device control unit that controls the drive status of one or more control subject device, based on the setting information.

According to such a configuration, a good balance between the stable driving and the functional enhancement in the case of driving by the power supplied from the internal power source can be achieved.

And also, the drive status setting unit may include a power supply capability determining unit that determines whether or not a first condition for determining the power supply capability in the internal power source is satisfied based on the power source information, and may also include a setting unit that selectively sets first setting information that does not allow a function of the device to be limited or second setting information that allows the function of the device to be limited, based on a determination result relating to the first condition in the power supply capability determining unit.

And also, the power supply capability determining unit may further determine whether or not a second condition for releasing the limit of the function of the device is satisfied, based on the power source information, if the first condition is satisfied, and if the second setting information is set. The setting unit may set the first setting information in place of the second setting information, based on a determination result relating to the second condition in the power supply capability determining unit.

And also, the device control unit may control the control subject device by a first drive status where the function of the device is not limited, if the first setting information is set. The device control unit may control the control subject device by a second drive status where the function of the device is limited in accordance with the second setting information, if the second setting information is set.

And also, the setting unit may set the first setting information, if it is determined in the power supply capability determining unit that the first condition is satisfied. The setting unit may set the second setting information, if it is not determined in the power supply capability determining unit that the first condition is satisfied.

And also, the setting unit may set third setting information that allows the function of the device to be limited more than the second setting information does, in place of the second setting information, if it is not determined in the power supply capability determining unit that the first condition is satisfied, and if the second setting information is set. The device control unit may control the control subject device by a third drive status where the function of the device is limited in accordance with the third setting information, if the third setting information is set.

And also, the power supply capability determining unit may do not determine that the second condition is satisfied before a predetermined time has passed since the drive status of the control subject device was switched.

According to another embodiment of the present invention, there is provided an information processing apparatus including an internal power source that supplies power to an apparatus body, and also including a power source information acquiring unit that acquires, from the internal power source, power source supply information that varies in accordance with a power supply status of the internal power source, and power source demand information of a device that varies in accordance with a drive status of the device. The information processing apparatus also includes a setting information storage unit that stores setting information to define a drive condition of the device. The information processing apparatus also includes a device control unit that controls the drive status of the device based on the power source supply information, the power source demand information, and the setting information.

According to such a configuration, a good balance between the stable driving and the functional enhancement in the case of driving by the power supplied from the internal power source can be achieved.

And also, the information processing apparatus may further include a drive power source discriminating unit that discriminates whether or not the apparatus body is driven by the internal power source, or driven by an external power source. The device control unit may control the drive status of the device, based on the power source supply information, the power source demand information, and the setting information, if it is determined in the drive power source discriminating unit that the apparatus body is driven by the internal power source.

And also, the device control unit may include a power supply capability determining unit that determines whether or not a first condition for determining power supply capability in the internal power source is satisfied based on the power source supply information and the power source demand information, and may also include a setting unit that selectively sets first setting information that does not allow a function of the device to be limited or second setting information that allows the function of the device to be limited, based on a determination result relating to the first condition in the power supply capability determining unit.

And also, the power supply capability determining unit may further determine whether or not a second condition for releasing the limit of the function of the device is satisfied, based on the power source supply information and the power source demand information, if the first condition is satisfied, and if the second setting information is set. The setting unit may set the first setting information in place of the second setting information, based on a determination result relating to the second condition in the power supply capability determining unit.

According to another embodiment of the present invention, there is provided a device control method including the steps of acquiring, from an internal power source, power source information relating to supply of power in the internal power source that supplies the power, determining power supply capability of the internal power source based on the power source information, setting setting information to define a drive status of a device in accordance with a determination result in the step of determining, and controlling the drive status of one or more control subject device based on the set setting information.

By use of such a method, a good balance between the stable driving and the functional enhancement in the case of driving by the power supplied from the internal power source can be achieved.

According to another embodiment of the present invention, there is provided a device control method including the steps of acquiring, from an internal power source, power source supply information that varies in accordance with a power supply status of the internal power source that supplies power to an apparatus body, and power source demand information of a device that varies in accordance with a drive status of the device, storing setting information to define a drive condition of the device, and controlling the drive status of the device based on the power source supply information, the power source demand information, and the setting information.

By use of such a method, a good balance between the stable driving and the functional enhancement in the case of driving by the power supplied from the internal power source can be achieved.

According to the present invention, a good balance between the stable driving and the functional enhancement in the case of driving by the power supplied from the internal power source can be achieved.

BRIEF DESCRIPTION OF THE DRAWINGS

FIG. 1 is an explanatory diagram showing one example of an acquisition method of power source information in an information processing apparatus according to an embodiment of the present invention;

FIG. 2 is an explanatory diagram showing one example of a predetermined condition for determining power supply capability in power supply by an internal power source according to the embodiment of the present invention;

FIG. 3 is an explanatory diagram showing one example of a predetermined condition for determining power supply capability in power supply by the internal power source according to the embodiment of the present invention;

FIG. 9 is an explanatory diagram showing one example of a configuration of the information processing apparatus according to the embodiment of the present invention;

DETAILED DESCRIPTION OF THE EMBODIMENTS

Figure 4:
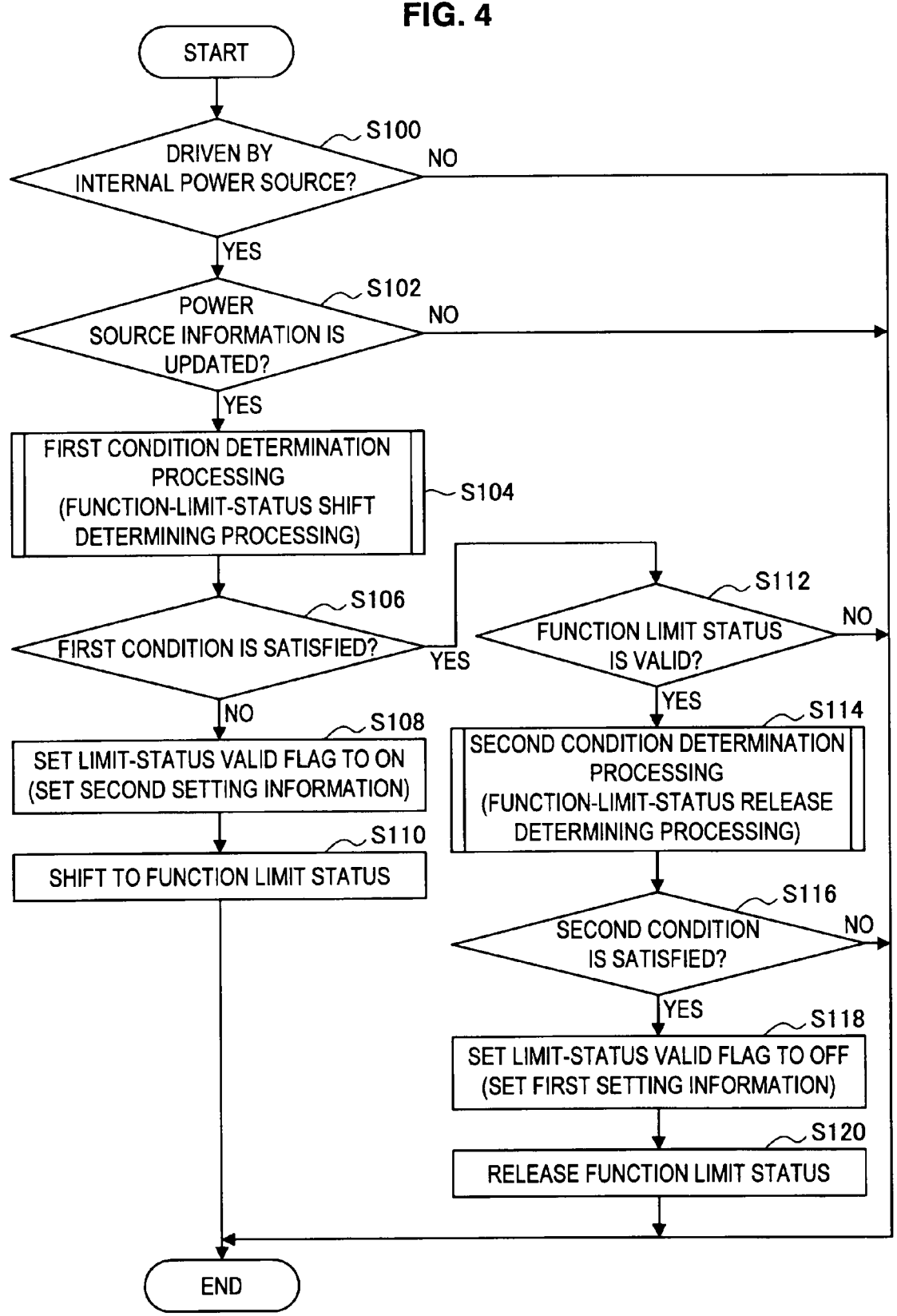
FIG. 4 is an explanatory diagram showing a first example of processing for realizing a device control approach in the information processing apparatus according to the embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, explanations are given in an order described below.

1. An approach according to an embodiment of the present invention
2. An information processing apparatus according to an embodiment of the present invention
3. A program according to an embodiment of the present invention

Approach According to the Embodiment of the Present Invention

Before explanation of a configuration of an information processing apparatus (hereinafter, referred to as "information processing apparatus 100") according to the embodiment of the present invention, a device control approach according to the embodiment of the present invention is described.

In what follows, explanations are given on the premise that the information processing apparatus 100 includes an internal power source that supplies power to respective devices included by the information processing apparatus 100. Here, as the internal power source according to the embodiment of the present invention, a secondary battery such as a lithium-ion secondary battery and a lithium-ion polymer secondary battery are cited, but the foregoing is not limitative.

A related-art information processing apparatus controls a device so that power consumption in the related-art information processing apparatus does not exceed supply power of an internal power source by changing an operating frequency using information acquired from the internal power source. Here, in a control method of the device according to the related art, as described above, the functional enhancement when the related-art information processing apparatus is driven by the internal power source can hardly be expected.

Consequently, the information processing apparatus 100 according to the embodiment of the present invention determines power supply capability of the internal power source based on a status of the power supply of the internal power source, and if the power supply capability of the internal power source satisfies a predetermined level, the function of the device included by the information processing apparatus 100 is enhanced. Moreover, if the power supply capability of the internal power source does not satisfy the predetermined level, the information processing device 100 limits the function of the device included by the information processing apparatus 100, and achieves stable driving of the information processing apparatus 100.

Here, the determination of the power supply capability of the internal power source according to the embodiment of the present invention corresponds to, for example, determining whether or not predetermined conditions for control of the device (e.g., a first condition and a second condition described later) are satisfied, based on the status of the power supply of the internal power source. Moreover, in the information processing apparatus 100, power consumption (power consumption in accordance with a drive status) in the information processing apparatus 100 can be known based on a type of each of the devices included by the information processing apparatus 100 and a drive status of each of the devices. Thus, the information processing apparatus 100 can determine, by using a power, a temperature of the internal power source and the like as the foregoing predetermined conditions, whether or not the power stably supplied from the internal power source has an allowance to the power consumption in the information processing apparatus 100. Accordingly, the determination of the power supply capability of the internal power source according to the embodiment of the present invention can be considered as the determination as to whether or not the supply power of the internal power source has an allowance (determination of the allowance of the power supply of the internal power source).

More specifically, for example, by performing processings (1) to (4), the information processing apparatus 100 achieves a good balance between the stable driving and the functional enhancement in the case of driving by the power supplied from the internal power source. Here, as the functional enhancement according to the embodiment of the present invention, for example, release of limit to processing (role) that the device included by the information processing apparatus 100 can execute, and increase in processing capacity to perform the relevant processing are cited, but the foregoing is not limitative. Moreover, the information processing apparatus 100 controls a function (functions) of, for example, one or more control subject device to be controlled among the devices included by the information processing apparatus 100, based on the foregoing determination, but the foregoing is not limitative. For example, the information processing apparatus 100 can control functions of all the devices included by the information processing apparatus 100, based on the foregoing determination.

Here, as the control subject device according to the embodiment of the present invention, for example, an MPU (Micro Processing Unit), a GPU (Graphics Processing Unit), a display device such as an LCD (Liquid Crystal Display), an optical disk device such as a Blu-ray (registered trademark) disk drive and the like are cited, but the foregoing is not limitative.

Moreover, the information processing apparatus 100, selectively, for example, performs the following processings (1) to (4) during driving by the internal power source, and does not perform the relevant processings during driving by an external power source and the like. This is because when the information processing apparatus 100 is driven by the external power source, the possibility that the power consumption of the information processing apparatus 100 exceeds power supplied from the external power source is extremely low. The information processing apparatus according to the embodiment of the present invention can also detect the power supplied from the external power source, and based on a detection result, perform processings similar to the following processings (2) to (4). The foregoing allows the information processing apparatus according to the embodiment of the present invention to realize stable operation, for example, even when the external power source is unstable.

(1) Acquisition Processing of Power Source Information from Internal Power Source The information processing apparatus 100 acquires power source information from the internal power source periodically/non-periodically. Here, the power source information according to the embodiment of the present invention is information relating to the supply of the power in the internal power source. As the power source information, for example, information indicating a status of the internal power source, which represents whether or not the internal power source is in a normal status, information of a temperature of the internal power source, information of a voltage supplied by the internal power source, information of a current supplied by the internal power source and the like are cited, but the foregoing is not limitative. Hereinafter, the information relating to the temperature of the internal power source, which varies in accordance with the power source supply status of the internal power source, such as the information of the temperature of the internal power source, may be referred to as "power source supply information". Moreover, hereinafter, the information relating to the power consumption of the device, which varies in according with the drive status of the device, such as the information of the voltage supplied by the internal power source, the information of the current supplied by the internal power source, may be collectively referred to as "power source demand information".

The power source information is, for example, periodically generated by the internal power source in accordance with the power supply. Here, the internal power source according to the embodiment of the present invention has a power source information generating function in addition to the power supply function. The internal power source, for example, includes various sensors for obtaining various types of information (e.g., a temperature sensor, a current sensor, a voltage sensor and the like), an MPU that generates the power source information based on detection results of the relevant sensors, and the like to thereby realize the power source information generating function. Obviously, a configuration of the internal power source according to the embodiment of the present invention is not limited to the foregoing.

Moreover, the acquisition of the power source information in the information processing apparatus 100 is performed by a control unit (more strictly speaking, a power source information acquiring unit 120, which will be described later) configured of an MPU or the like included by the information processing apparatus 100, for example, by means of communication of the control unit with the internal power source. Moreover, the communication between the control unit and the internal power source, for example, is performed through a BIOS (Basic Input/Output System: basic software), but the foregoing is not limitative.

FIG. 1 is an explanatory diagram showing one example of an acquisition method of the power source information in the information processing apparatus 100 according to the embodiment of the present invention. Here, FIG. 1 shows one example of information acquisition commands transmitted for acquisition of the power source information from the BIOS to the internal power source. "Battery Status" shown in FIG. 1 is an acquisition command to request the information indicating a status of the internal power source, and "Battery Temp" shown in FIG. 1 is an acquisition command to request the information of the temperature of the internal power source. "Voltage" shown in FIG. 1 is an acquisition command to request the information of the voltage supplied by the internal power source, and "Current" shown in FIG. 1 is an acquisition command to request the information of the current supplied by the internal power source. Moreover, the "Battery Status", "Battery Temp", "Voltage" and "Current" shown in FIG. 1, for example, correspond to the information acquisition requests corresponding to one piece of power source information.

In the information processing apparatus 100, for example, the respective acquisition commands shown in FIG. 1 are transmitted to the internal power source by the control unit periodically every 100 [msec] through the BIOS to thereby perform the acquisition of the power source information. Obviously, the acquisition method of the power source information according to the embodiment of the present invention is not limited to the method by the acquisition commands shown in FIG. 1.

(2) Determination Processing of Power Supply Capability in Power Supply by Internal Power Source The information processing apparatus 100 determines the power supply capability in the power supply of the internal power source based on the power source information acquired in the above-described processing (1). The information processing apparatus 100, for example, determines whether or not the predetermined conditions for determining the power supply capability in the power supply by the internal power source are satisfied, based on the power source information to thereby determine the power supply capability in the power supply by the internal power source. More specifically, the information processing apparatus 100, for example, in advance stores two conditions of a first condition for determining whether or not to limit a function, and a second condition for determining whether or not to release the limited function, respectively. The information processing apparatus 100 compares the conditions stored in advance and the power source information acquired from the internal power source to thereby determine whether or not the conditions are satisfied. Here, if the information indicating the status of the internal power source included in the power source information represents an abnormal status, the information processing apparatus 100, for example, stops the supply of the power from the internal power source without performing the foregoing determination.

As described above, in the information processing apparatus 100, the two conditions of the first condition for determining whether or not to limit the function and the second condition for determining whether or not to release the limited function are used. Here, in the information processing apparatus 100, using the two conditions when the power supply capability in the power supply of the internal power source is determined is to further enhance safety in the driving by the internal power source. The information processing apparatus according to the embodiment of the present invention is not limited to the determination of the power supply capability in the power supply by the internal power source based on the two conditions. For example, the information processing apparatus according to the embodiment of the present invention can also determine the power supply capability in the power supply of the internal power source, based on one condition.

In what follows, an explanation is given on the premise that the information processing apparatus 100 limits the function if it is not determined that the first condition is satisfied. Moreover, in what follows, an explanation is given on the premise that the information processing apparatus 100 releases the limited function if it is determined that the second condition is satisfied. Obviously, relationships between the determination results of the predetermined conditions for determining the power supply capability in the power supply by the internal power source according to the embodiment of the present invention and the limit/limit release of the function are not limited to the foregoing.

Example of Predetermined Conditions for Determining Power Supply Capability in Power Supply by Internal Power Source

[2-1] First Condition

FIG. 2 is an explanatory diagram showing one example of the predetermined condition for determining the power supply capability in the power supply by the internal power source according to the embodiment of the present invention. Here, FIG. 2 shows one example of the first condition for determining whether or not to limit the function, and shows an example in which the information processing apparatus 100 stores the first condition in a table form.

Referring to FIG. 2, the first condition is configured of conditions relating to the temperature of the internal power source (a condition A, a condition C and a condition E shown in FIG. 2), and conditions relating to the power (a condition B and a condition D shown in FIG. 2). The information processing apparatus 100 determines whether or not the conditions relating to the temperature of the internal power source according to the first condition are satisfied based on comparison between the information of the temperature of the internal power source included in the power source information acquired from the internal power source, and the conditions relating to the temperature of the internal power source according to the first condition. Moreover, the information processing apparatus 100 derives the power supplied by the internal power source, from the information of the voltage supplied by the internal power source and the information of the current supplied by the internal power source, which are included in the power source information acquired from the internal power source. The information processing apparatus 100 then determines whether or not the conditions relating to the power of the internal power source according to the first condition are satisfied, based on comparison between the derived power and the conditions relating to the power according to the first condition. Obviously, the first condition according to the embodiment of the present invention is not limited to that of FIG. 2. Moreover, a specific example of the determination processing according to the first condition in the information processing apparatus 100 will be described later.

[2-2] Second Condition

FIG. 3 is an explanatory diagram showing one example of the predetermined condition for determining the power supply capability in the power supply by the internal power source according to the embodiment of the present invention. Here, FIG. 3 shows one example of the second condition for determining whether or not to release the limited function, and shows an example in which the information processing apparatus 100 stores the second condition in a table form.

Referring to FIG. 3, the second condition is configured of conditions relating to the temperature of the internal power source (a condition F, a condition G, a condition J and a condition K shown in FIG. 3), a condition relating to the voltage of the internal power source (a condition H shown in FIG. 3), and a condition relating to the power (a condition I shown in FIG. 3). The information processing apparatus 100 determines whether or not the conditions relating to the temperature of the internal power source according to the second condition are satisfied, based on comparison between the information of the temperature of the internal power source included in the power source information acquired from the internal power source, and the conditions relating to the temperature of the internal power source according to the second condition. Moreover, the information processing apparatus 100 determines whether or not the condition relating to the voltage of the internal power source according to the second condition is satisfied, based on comparison between the information of the voltage supplied by the internal power source, which is included in the power source information acquired from the internal power source, and the condition relating to the voltage of the internal power source according to the second condition. Further, the information processing apparatus 100 derives the power supplied by the internal power source from the information of the voltage supplied by the internal power source and the information of the current supplied by the internal power source, which are included in the power source information acquired from the internal power source. The information processing apparatus 100 then determines whether or not the condition relating to the power of the internal power source according to the second condition is satisfied, based on comparison of the derived power and the condition relating to the power according to the second condition. Obviously, the second condition according to the embodiment of the present invention is not limited to that of FIG. 3. Moreover, specific examples of the determination processing according to the second condition in the information processing apparatus 100 will be described later.

The information processing apparatus 100 determines the power supply capability in the power supply by the internal power source, for example, by using the first condition shown in FIG. 2, the second condition shown in FIG. 3, and the power source information acquired from the internal power source.

(3) Setting Processing of Setting Information

The information processing apparatus 100 sets setting information in accordance with a determination result in the foregoing processing (2). Here, the setting information according to the embodiment of the present invention is information to define the drive status of the device. As the setting information, for example, first setting information that does not allow the function of the device to be limited, and second setting information that allows the function of the device to be limited are cited, but the foregoing is not limitative. For example, the information processing apparatus 100 can set a plurality of pieces of setting information different in limit level at which the function of the device is limited, such as third setting information that allows the function of the device to be limited more than the second setting information does.

Moreover, the information processing apparatus 100, for example, can set the setting information by changing a value of a flag in which the status is represented by one bit or a plurality of bits in accordance with the determination result in the foregoing processing (2), but the foregoing is not limitative. Hereinafter, an explanation is given taking, as one example, a case where the information processing apparatus 100 sets the setting information in a flag form. Moreover, the information processing apparatus 100, for example, stores the setting information in a storage unit (described later) or the like. Here, the storage medium that stores the setting information, for example, the storage unit (described later) or the like, plays a role of a setting information storage unit in the information processing apparatus 100.

(4) Drive Control Processing for Control Subject Device

The information processing apparatus 100 performs drive control of the device to be controlled, based on the setting information set in the forgoing processing (3).

[4-1] When First Setting Information is Set

For example, when the first setting information that does not allow the function of the device to be limited is set, it is a status where the power supply capability of the internal power source satisfies the predetermined level, and thus, the information processing apparatus 100, for example, does not limit the function of the control subject device. Thus, in the foregoing case, the information processing apparatus 100 can exert higher functionality.

A drive control method of the device when the first setting information is set in the information processing apparatus 100 is not limited to not limiting the function of the control subject device. For example, the information processing apparatus 100 can achieve further functional enhancement, such as increase of a processing clock of the control subject device as compared with a normal status where the function is not limited. Hereinafter, an explanation is given on the premise that when the first setting information is set, the information processing apparatus 100 achieves the functional enhancement by not limiting the function of the control subject device.

[4-2] When Second Setting Information/Third Setting Information is Set

Moreover, for example, when the setting information that allows the function of the device to be limited (the second setting information, the third setting information or the like) is set, it indicates a status where the power supply capability of the internal power source does not satisfy the predetermined level. The information processing apparatus 100, therefore, limits the function of the control subject device in accordance with the setting information. Thus, in the foregoing case, the information processing apparatus 100 can prevent the power consumption in the information processing apparatus 100 from exceeding the supply power of the internal power source. Here, as a control method in accordance with the setting information, for example, changing a number of the control subject devices whose functions are to be limited in accordance with the setting information is cited, but the foregoing is not limitative. For example, the information processing apparatus 100 can also limit the function of the control subject device in accordance with the setting information by changing a control amount of the control subject device (e.g., a variation amount of clock frequency).

Moreover, in the setting information that allows the function of the device to be limited (the second setting information, the third setting information or the like), priority indicating an order or the like for controlling the devices on a priority basis may be set. Here, as a setting method of the foregoing priority, for example, a method of setting higher priority to the device of higher power consumption, and a method of setting higher priority to the device having a larger effect by the control (e.g., a power consumption reducing effect or the like) are cited, but the foregoing is not limitative.

Examples of Function Limit in Information Processing Apparatus 100

When the setting information that allows the function of the device to be limited (the second setting information, the third setting information or the like) is set, the information processing apparatus 100 limits the function of the control subject device, for example, as follows. Obviously, the control subject device according to the embodiment of the present invention is not limited to the following [A] to [D], and limit methods of the control subject devices are not limited to the method described below.

[A] MPU

The information processing apparatus 100 lowers a clock frequency of the MPU in accordance with the set setting information. Here, the information processing apparatus 100, for example, puts a terminal for switching the drive status included by the MPU into an active status in accordance with the setting information to thereby control the clock frequency of the MPU in accordance with the setting information.

[B] GPU

The information processing apparatus 100 lowers a clock frequency of the GPU in accordance with the set setting information. Here, the information processing apparatus 100, for example, puts a terminal for switching the drive status included by the GPU into an active status in accordance with the setting information to thereby control the clock frequency of the GPU in accordance with the setting information.

[C] Display Device

The information processing apparatus 100 lowers brightness of the display device in accordance with the set setting information. Here, the information processing apparatus 100 causes basic software such as the BIOS and an OS (Operating System) and a driver that controls the display and the like to cooperate with each other, thereby realizing the brightness control in accordance with the setting information, but the foregoing is not limitative.

[D] Optical Disk Drive

The information processing apparatus 100 lowers the power to be supplied to an optical disk drive in accordance with the set setting information. Here, the information processing apparatus 100, for example, causes the basic software such as the BIOS to switch a changing-over switch included in a power source circuit of the optical disk drive, thereby lowering the power to be supplied to the optical disk drive, but the foregoing is not limitative. Moreover, the information processing apparatus 100, for example, can also make initial state setting for normally operating the optical disk drive at the time of switching by the foregoing changing-over switch.

The information processing apparatus 100, for example, performs the above-described processings (1) to (4). Here, the information processing apparatus 100 determines the status of the power supply of the internal power source based on the power source information and sets the setting information in accordance with the determination result. The information processing apparatus 100 controls one or more control subject device based on the set setting information. More specifically, if it is determined that the power supply capability of the internal power source satisfies the predetermined level, the information processing apparatus 100 sets the first setting information that does not allow the function of the device to be limited, so that the function of the control subject device is not limited (or the function is further enhanced). That is, if it is determined that the power supply capability of the internal power source satisfies the predetermined level, the information processing apparatus 100 further enhances the function. Moreover, if it is not determined that the power supply capability of the internal power source satisfies the predetermine level, the information processing apparatus 100 sets the setting information that allows the function of the device to be limited (the second setting information, the third setting information or the like), so that the function is limited in accordance with the set setting information. That is, if it is not determined that the power supply capability of the internal power source satisfies the predetermine level, the information processing apparatus 100 decreases the power consumption of the control subject device by limiting the function to thereby prevent the power consumption of the information processing apparatus 100 from exceeding the supply power of the internal power source.

Accordingly, by the foregoing processings (1) to (4), the information processing apparatus 100 can achieve a good balance between the stable driving and the functional enhancement in the case of driving by the power supplied from the internal power source.

One Example of Processing According to Device Control Approach

Next, the processing for realizing the above-described device control approach according to the embodiment of the present invention is more specifically described.

[I] First Example of Processing for Realizing Device Control Approach

FIG. 4 is an explanatory diagram showing a first example of the processing for realizing the device control approach in the information processing apparatus 100 according to the embodiment of the present invention. Here, the processing shown in FIG. 4 is not a type of processing that ends when it is performed once, but the information processing apparatus 100 repeats the processing shown in FIG. 4, for example, every time the processing shown in FIG. 4 ends, or periodically.

The information processing apparatus 100 determines whether or not the driving is performed by the internal power source (S100). Here, the information processing apparatus 100 performs the determination in step S100, for example, based on whether or not the power is obtained from an external power source, but the foregoing is not limitative. If in step S100, it is not determined that the driving is performed by the internal power source, the information processing apparatus 100 ends the processing.

If in step S100, it is determined that the driving is performed by the internal power source, then the information processing apparatus 100 determines whether or not the power source information is updated (S102). Here, although not shown in FIG. 4, if in step S100, it is determined that the driving is performed by the internal power source, the information processing apparatus 100, for example, periodically performs acquisition of the power source information from the internal power source (the above-described processing (1)). Moreover, the information processing apparatus 100 temporarily holds the acquired power source information, and once new power source information is acquired, the newly acquired power source information and the held power source information are compared to perform the processing in step S102, but the foregoing is not limitative.

If in step S102, it is not determined that the power source information is updated, the information processing apparatus 100 ends the processing. Moreover, if in step S102, it is determined that the power source information is updated, the information processing apparatus 100 performs first condition determination processing (S104). Here, the information processing apparatus 100, for example, performs the processing in step S104 using the power source information acquired from the internal power source and the table shown in FIG. 2, on which the first condition is recorded. Moreover, the processing in step S104 and processing in step S106 described later are the processing for determining whether or not the first condition is satisfied, and correspond to the processing for determining whether or not to limit the function in the information processing apparatus 100 (the above-described processing (2)).

First Condition Determination Processing

Figure 5:
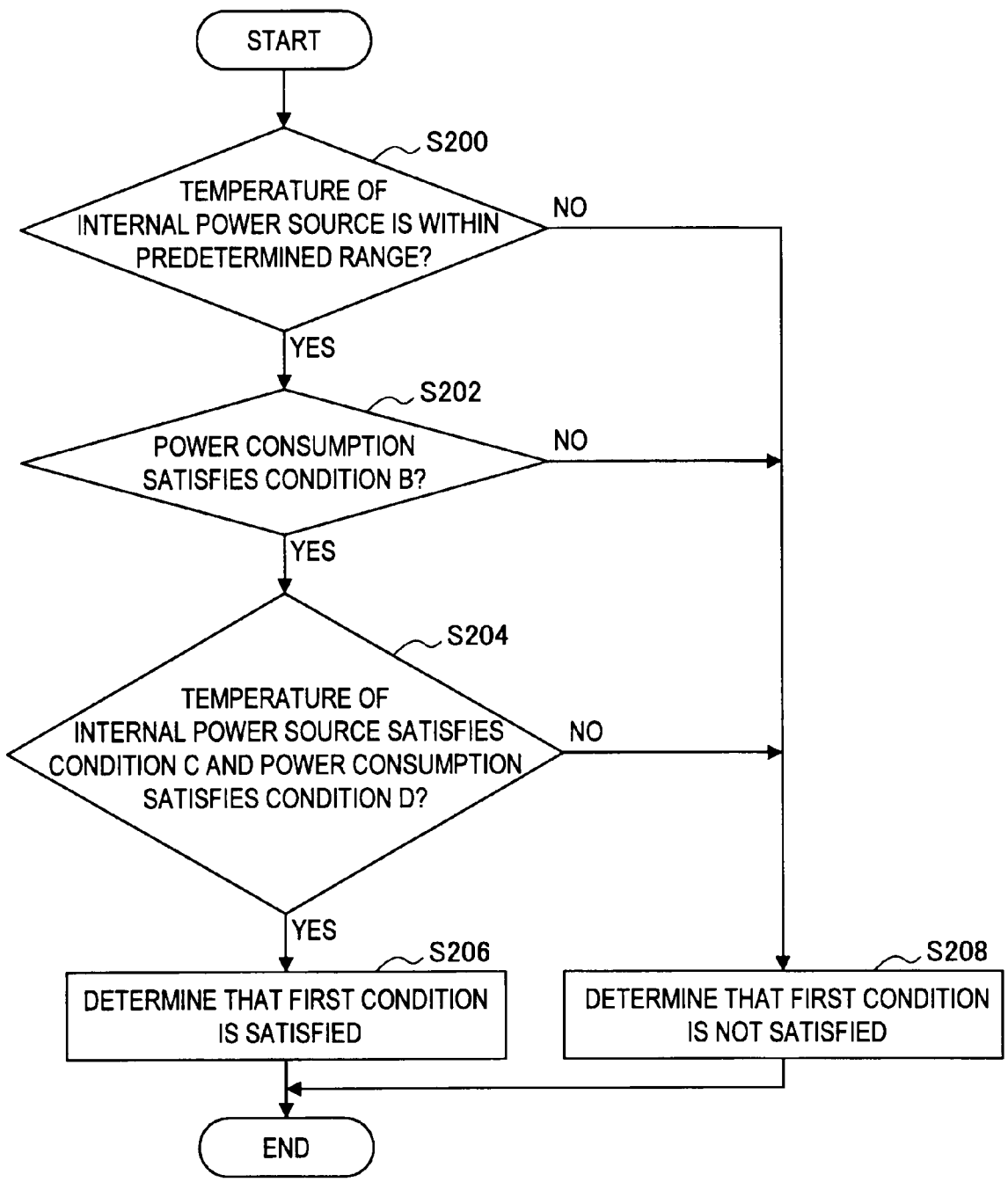
FIG. 5 is a flowchart showing one example of first condition determination processing in the information processing apparatus according to the embodiment of the present invention.

FIG. 5 is a flowchart showing one example of the first condition determination processing in the information processing apparatus 100 according to the embodiment of the present invention.

The information processing apparatus 100 determines whether or not the temperature of the internal power source is within a predetermined range (S200). The information processing apparatus 100 determines whether or not a temperature T of the internal power source is within the predetermined range (in the example of FIG. 2, 5 degrees<T<60 degrees), based on the information of the temperature of the internal power source included in the power source information and the condition A and condition E shown in FIG. 2.

If in step S200, it is not determined that the temperature of the internal power source is within the predetermined range, the information processing apparatus 100 determines that the first condition is not satisfied (S208).

Moreover, if in step S200, it is determined that the temperature of the internal power source is within the predetermined range, the information processing apparatus 100 determines whether or not the power consumption satisfies the condition B (condition B of FIG. 2) according to the first condition (S202).

If in step S202, it is not determined that the power consumption satisfies the condition B according to the first condition, the information processing apparatus 100 determines that the first condition is not satisfied (S208).

Moreover, if in step S202, it is determined that the power consumption satisfies the condition B according to the first condition, the information processing apparatus 100 determines whether or not the temperature of the internal power source satisfies the condition C (Condition C of FIG. 2) and the power consumption satisfies the condition D (condition D of FIG. 2) (S204).

If in step S204, it is not determined that the temperature of the internal power source satisfies the condition C and the power consumption satisfies the condition D, the information processing apparatus 100 determines that the first condition is not satisfied (S208).

Moreover, if in step S204, it is determined that the temperature of the internal power source satisfies the condition C and the power consumption satisfies the condition D, the information processing apparatus 100 determines that the first condition is satisfied (S206).

The information processing apparatus 100 determines whether or not the first condition is satisfied, for example, by the processing shown in FIG. 5. The first condition determination processing according to the embodiment of the present invention is not limited to the processing shown in FIG. 5. For example, the information processing apparatus 100 can perform the respective processings in steps S200, S202, S204 shown in FIG. 5 in an arbitrary order.

Referring again to FIG. 4, the processing for realizing the device control approach in the information processing apparatus 100 is described. The information processing apparatus 100 determines whether or not the first condition is satisfied (S106).

If in step S106, it is not determined that the first condition is satisfied, the information processing apparatus 100 determines that the power supply capability of the internal power source does not satisfy the predetermined level, and sets a limit-status valid flag for limiting the function to ON (S108). Here, the limit-status valid flag set by the information processing apparatus 100 in the processing of FIG. 4 corresponds to the setting information. Moreover, the processing in step S108, for example, corresponds to setting the second setting information for limiting the function (the above-described processing (3)).

When the limit-status valid flag is set to ON in step S108 (the second setting information is set), then the information processing apparatus 100 shifts to a function limit status where the function is limited (a second drive status) based on the limit-status valid flag (S110). The information processing apparatus 100 ends the processing.

Here, as the function limit status according to an embodiment of the present invention, controlling one or more control subject device, for example, as shown in the above-described [A] to [D] is cited, but the foregoing is not limitative. Moreover, the processing in step S110 corresponds to the above-described processing (4).

Thus, if the limit-status valid flag is ON, the information processing apparatus 100 limits the function of the control subject device, and drives the control subject device in a status where the power consumption is reduced. Accordingly, the information processing apparatus 100 can prevent the power consumption in the information processing apparatus 100 from exceeding the supply power of the internal power source.

If in step S106, it is determined that the first condition is satisfied, the information processing apparatus 100 determines whether or not the function limit status is valid (S112). Here, for example, if the limit-status valid flag is ON (that is, if the second setting information is set), the information processing apparatus 100 determines that the function limit status is valid, but the foregoing is not limitative.

If in step S112, it is not determined that the function limit status is valid, it is a status where the power supply capability of the internal power source satisfies the predetermined level, and the function is not limited, the information processing apparatus 100 ends the processing. Thus, in the foregoing case, the information processing apparatus 100 can be driven in a higher-function status where the function is not limited.

If in step S112, it is determined that the function limit status is valid, it is a status where the power supply capability of the internal power source satisfies the predetermined level, and the function is limited, and thus, the information processing apparatus 100 performs second condition determination processing (S114). Here, the information processing apparatus 100 performs the processing in step S114, for example, using the power source information acquired from the internal power source and the table shown in FIG. 3, on which the second condition is recorded. Moreover, the processing in step S114 and the processing in step S116 described later are the processing for determining whether or not the second condition is satisfied, and correspond to the processing for determining whether or not to release the limit of the function in the information processing apparatus 100 (the above-described processing (2)).

Second Condition Determination Processing

[i] First Example of Second Condition Determination Processing

Figure 6:
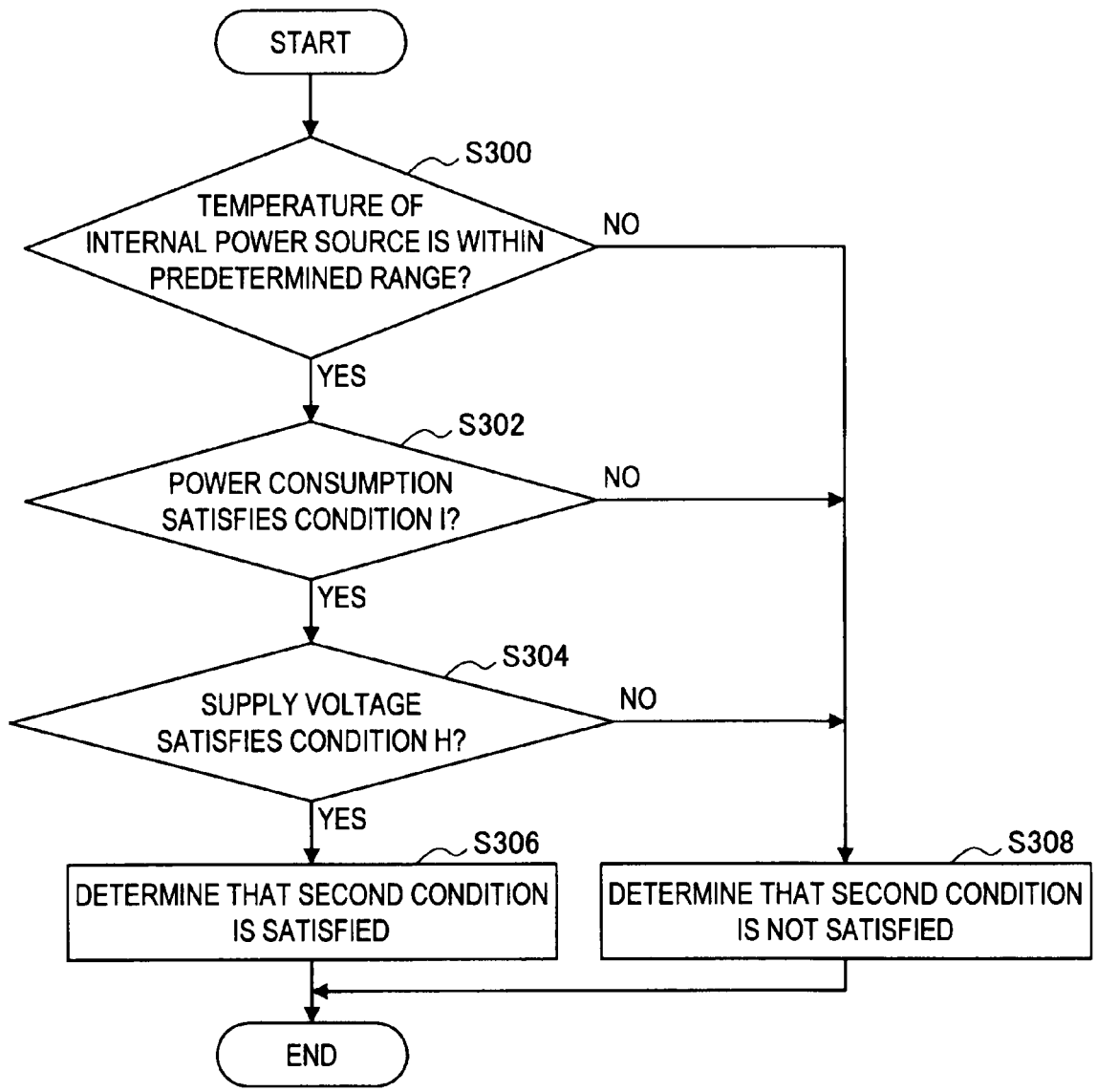
FIG. 6 is a flowchart showing a first example of second condition determination processing in the information processing apparatus according to the embodiment of the present invention.

FIG. 6 is a flowchart showing a first example of the second condition determination processing in the information processing apparatus 100 according to the embodiment of the present invention.

The information processing apparatus 100 determines whether or not the temperature of the internal power source is within the predetermined range (S300). The information processing apparatus 100 determines whether or not the temperature T of the internal power source is within the predetermined range (in the example FIG. 3, 5 degrees<T<60 degrees), based on the information of the temperature of the internal power source included in the power source information, and the condition F and the condition K shown in FIG. 3.

If in step S300, it is not determined that the temperature of the internal power source is within the predetermined range, the information processing apparatus 100 determines that the second condition is not satisfied (S308).

Moreover, if in step S300, it is determined that the temperature of the internal power source is within the predetermined range, the information processing apparatus 100 determines whether or not the power consumption satisfies the condition I (condition I of FIG. 3) according to the second condition (S302).

If in step S302, it is not determined that the power consumption satisfies the condition I according to the second condition, the information processing apparatus 100 determines that the second condition is not satisfied (S308).

Moreover, if in step S302, it is determined that the power consumption satisfies the condition I according to the second condition, the information processing apparatus 100 determines whether or not the supply voltage of the internal power source satisfies the condition H (the condition H of FIG. 3) (S304).

If in step S304, it is not determined that the supply voltage of the internal power source satisfies the condition H, the information processing apparatus 100 determines that the second condition is not satisfied (S308).

Moreover, if in step S304, it is determined that the supply voltage of the internal power source satisfies the condition H, the information processing apparatus 100 determines that the second condition is satisfied (S306).

The information processing apparatus 100 determines whether or not the second condition is satisfied, for example, by the processing shown in FIG. 6. The first example of the second condition determination processing according to the embodiment of the present invention is not limited to the processing shown in FIG. 6. For example, the information processing apparatus 100 can perform the respective processings in steps S300, S302, S304 shown in FIG. 6 in an arbitrary order.

[ii] Second Example of Second Condition Determination Processing

Figure 7:
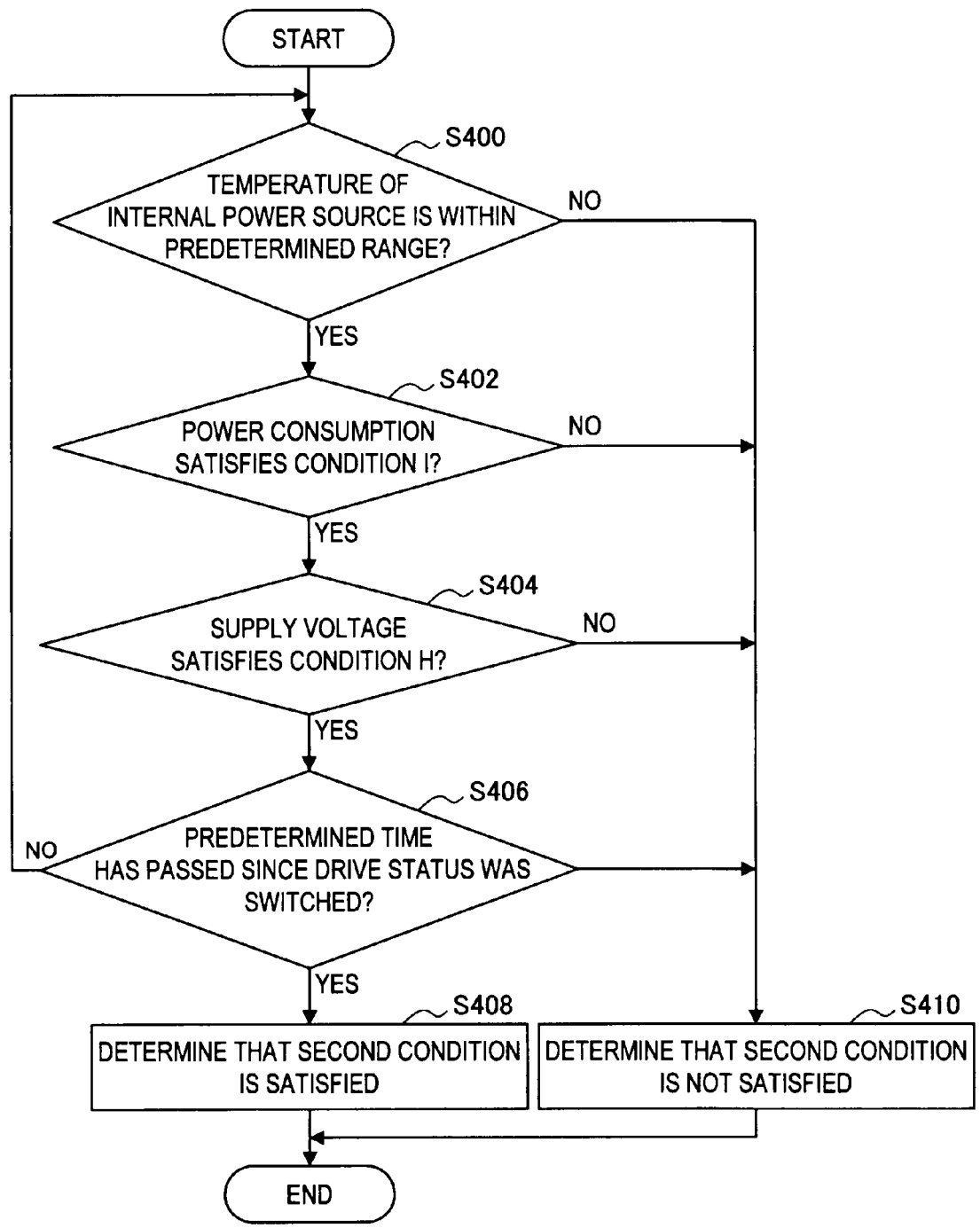
FIG. 7 is a flowchart showing a second example of second condition determination processing in the information processing apparatus according to the embodiment of the present invention.

In the foregoing, as the first example of the second condition determination processing, the processing of performing the determination according to the second condition based on whether or not the predetermined conditions are satisfied has been described. However, the second condition determination processing according to the embodiment of the present invention is not limited to the first example shown in FIG. 6. FIG. 7 is a flowchart showing a second example of the second condition determination processing in the information processing apparatus 100 according to the embodiment of the present embodiment.

The information processing apparatus 100 determines whether or not the temperature of the internal power source is within the predetermined range as in step S300 of FIG. 6 (S400).

If in step S400, it is not determined that the temperature of the internal power source is within the predetermined range, the information processing apparatus 100 determines that the second condition is not satisfied (S410).

Moreover, if in step S400, it is determined that the temperature of the internal power source is within the predetermined temperature, the information processing apparatus 100 determines whether or not the power consumption satisfies the condition I (the condition I of FIG. 3) according to the second condition as in step S302 of FIG. 6 (S402).

If in step S402, it is not determined that the power consumption satisfies the condition I according to the second condition, the information processing apparatus 100 determines that the second condition is not satisfied (S410).

If in step S402, it is determined that the power consumption satisfies the condition I according to the second condition, the information processing apparatus 100 determines whether or not the supply voltage of the internal power source satisfies the condition H (the condition H of FIG. 3) as in step S304 of FIG. 6 (S404).

If in step S404, it is not determined that the supply voltage of the internal power source satisfies the condition H, the information processing apparatus 100 determines that the second condition is not satisfied (S410).

If in step S404, it is determined that the supply voltage of the internal power source satisfies the condition H, the information processing apparatus 100 determines whether or not a predetermined time has passed since the drive status was switched (S406). Here, the information processing apparatus 100, for example, counts up a counter from 0 (zero) when the apparatus shifts to the function limit status in step S110 of FIG. 4, and performs the determination in step S406 depending on whether or not a value of the relevant counter exceeds a predetermined threshold, but the foregoing is not limitative.

If in step S406, it is not determined that the predetermined time has passed since the drive status was switched, the information processing apparatus 100 repeats the processing from the step S400.

Moreover, if in step S406, it is determined that the predetermined time has passed since the drive status was switched, the information processing apparatus 100 determines that the second condition is satisfied (S408).

The information processing apparatus 100 determines whether or not the second condition is satisfied, for example, by the processing shown in FIG. 7. Here, by performing the processing shown in FIG. 7, the information processing apparatus 100 does not determine that the second condition is satisfied, if the predetermined time has not passed since the drive status was switched. Accordingly, the information processing apparatus 100 can prevent itself from falling into an unstable state here the setting and release of the function limit status where the function is limited are repeated for a short period, by performing the processing shown in FIG. 7 as the second condition determination processing.

The second example of the second condition determination processing according to the embodiment of the present invention is not limited to the processing shown in FIG. 7. For example, the information processing apparatus 100 can perform the respective processings in steps S400, S402, S404 shown in FIG. 7 in an arbitrary order as in the first example shown in FIG. 6.

Referring again to FIG. 4, the processing for realizing the device control approach in the information processing apparatus 100 is described. When the processing in step S114 is performed, the information processing apparatus 100 determines whether or not the second condition is satisfied (S116).

If in step S116, it is not determined that the second condition is satisfied, the information processing apparatus 100 ends the processing. In the foregoing case, since although the power supply capability of the internal power source satisfies the predetermined level, the internal power source is in a status where the limit of the function may not be released, the information processing apparatus 100 maintains the status where the function of the control subject device is limited. Thus, the information processing apparatus 100 can prevent undue load on the internal power source and enhance the safety.

If in step S116, it is determined that the second condition is satisfied, the limit-status valid flag for limiting the function is set to OFF (S118). Here, the processing in step S118, for example, corresponds to setting the first setting information that does not allow the function to be limited (the above-described processing (3)). Moreover, in the foregoing case, since the power supply capability of the internal power source satisfies the predetermined level, and the internal power source is in a status where the limit of the function can be released, the information processing apparatus 100 can switch the drive status safely.

Once the limit-status valid flag is set to OFF in step S118 (the first setting information is set), the information processing apparatus 100 releases the function limit status where the function is limited, based on the limit-status valid flag (S120). The information processing apparatus 100 then ends the processing. Here, the processing in step S120 corresponds to the above-described processing (4).

Thus, if the control-status valid flag is OFF, the information processing apparatus 100 drives the control subject device in the status where the function of the control subject device is not limited (first drive status), that is, the status where higher functionality can be realized. Accordingly, the information processing apparatus 100 can exert the higher functionality in the driving by the internal power source.

The information processing apparatus 100 can realize the processings (1) to (4) according to the above-described device control approach, for example, by performing the processing shown in FIG. 4. Accordingly, by performing the processing shown in FIG. 4, the information processing apparatus 100 can achieve a good balance between the stable driving and the functional enhancement in the case of driving by the power supplied from the internal power source.

[II] Second Example of Processing for Realizing Device Control Approach

In the foregoing, as the first example of the processing for realizing the device control approach, the processing in which the information processing apparatus 100 controls the control subject device in the two drive statuses where the function is limited and where the function is not limited (the first drive status/second drive status) has been described. However, the processing for realizing the device control approach according to the embodiment of the present invention is not limited to controlling the control subject device in the two drive statuses. Next, as a second example of the processing for realizing the device control approach according to the embodiment of the present invention, one example of the processing in which the function can be controlled in a plurality of drive statuses is described. In what follows, an example of the processing in which the information processing apparatus 100 switches a first drive status, a second drive status and a third drive status is described. Here, the second drive status is a first function limit status where the function is limited corresponding to the foregoing second setting information, and the third drive status is a second function limit status where the function is limited corresponding to the foregoing third setting information. Moreover, the first drive status is a drive status where the function limit status is released.

Figure 8A:
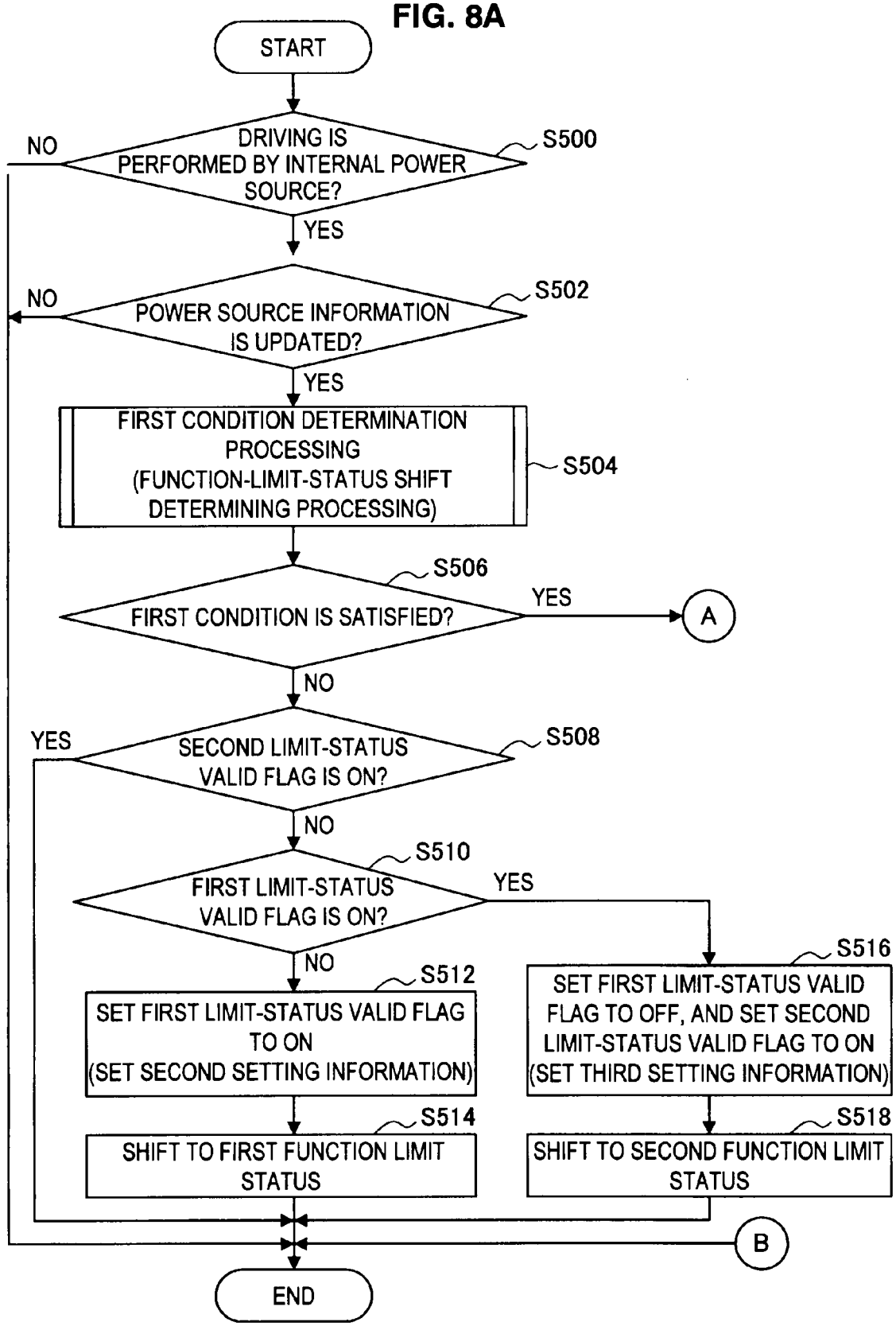
FIG. 8A is an explanatory diagram showing a second example of processing for realizing a device control approach in the information processing apparatus according to the embodiment of the present invention.
Figure 8B:
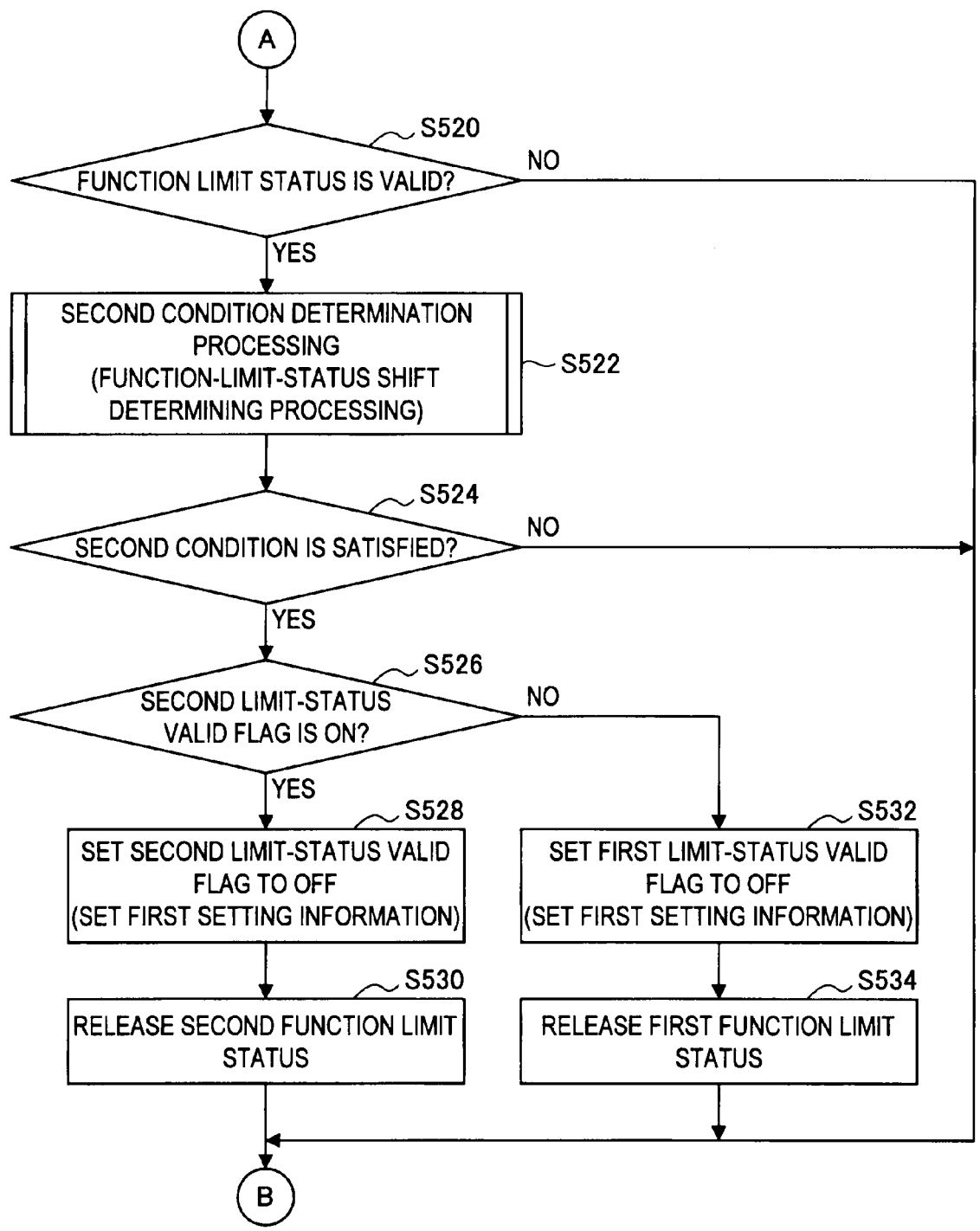
FIG. 8B is an explanatory diagram showing the second example of processing for realizing a device control approach in the information processing apparatus according to the embodiment of the present invention.

FIGS. 8A and 8B are explanatory diagrams showing the second example of the processing for realizing the device control approach in the information processing apparatus according to the embodiment of the present invention. Hereinafter, referring to FIGS. 8A and 8B as needed, the second example of the processing for realizing the device control approach according to the embodiment of the present invention is described. Here, the processing shown in FIGS. 8A, 8B, similar to the processing according to the first example shown in FIG. 4, is not a type of processing that ends when it is performed once, but the information processing apparatus 100 repeats the processing shown in FIGS. 8A, 8B, for example, every time the processing shown in FIGS. 8A, 8B ends or periodically.

Hereinafter, an explanation is given, taking as an example a case where the information processing apparatus 100 sets the first setting information, the second setting information and the third setting information in a flag form as in the first example shown in FIG. 4. Moreover, hereinafter, a case where the information processing apparatus 100 sets the setting information by two flags of a first limit-status valid flag and a second limit-status valid flag is exemplified. Here, an explanation is given on the premise that a status where the first limit-status valid flag is ON denotes a status where the second setting information is set, and a status where the second limit-status valid flag is ON denotes a status where the third setting information is set, but the foregoing is not limitative.

The information processing apparatus 100 determines whether or not the driving is performed by the internal power source as in the step S100 of FIG. 4 (S500).

If in step S500, it is determined that the driving is performed by the internal power source, then the information processing apparatus 100 determines whether or not the power source information is updated as in step S102 of FIG. 4 (S502). Here, although not shown in FIG. 8A, if in step S500, it is determined that the driving is performed by the internal power source, the information processing apparatus 100, for example, periodically performs acquisition of the power source information from the internal power source as in the processing according to the first example shown in FIG. 4 (the above-described processing (1)).

If in step S502, it is not determined that the power source information is updated, the information processing apparatus 100 ends the processing. Moreover, if in step S502, it is determined that the power source information is updated, the information processing apparatus 100 performs the first condition determination processing as in step S104 of FIG. 4 (S504). Here, the processing in step S504 and processing in step S506 described later are the processing for determining whether or not the first condition is satisfied, and corresponds to the processing for determining whether or not to limit the function in the information processing apparatus 100 (the above-described processing (2)).

If in step S506, it is not determined that the first condition is satisfied, the information processing apparatus 100 determines that the power supply capability of the internal power source does not satisfy the predetermined level. The information processing apparatus 100 then determines whether or not the second limit-status valid flag is ON (whether or not the third setting information is set) (S508).

If in step S508, it is determined that the second limit-status valid flag is ON, then the information processing apparatus 100 ends the processing. The foregoing case is a status where the limit of the function may not be released, and a status where the function is maximally limited (in the case of FIGS. 8A, 8B). Thus, the information processing apparatus 100 can more surely prevent the power consumption in the information processing apparatus 100 from exceeding the supply power of the internal power source by not switching the drive status in the foregoing case.

The processing of the information processing apparatus 100 when it is determined that the second limit-status valid flag is ON in step S508 is not limited to the foregoing. For example, the information processing apparatus 100 can store a third condition according to whether or not the power supply capacity of the internal power source in the first function limit status satisfies the predetermined level. In the foregoing case, the information processing apparatus 100 can also switch the drive status from the second function limit status to the first function limit status by performing the determination according to the foregoing third condition.

If in step S508, it is not determined that the second limit-status valid flag is ON, the information processing apparatus 100 determines whether or not the first limit-status valid flag is ON (S510).

If in step S510, it is not determined that the first limit-status valid flag is ON, the information processing apparatus 100 sets the first limit status valid flag to ON (S512). Here, the processing in step S512 corresponds to, for example, setting the second setting information for limiting the function (the above-described processing (3)).

Once the first limit-status valid flag is set to ON (the second setting information is set) in step S512, the information processing apparatus 100, based on the first limit-status valid flag, shifts to the first function limit status where the function is limited, corresponding to the second setting information (S514). The information processing apparatus 100 then ends the processing. Here, the processing in step S514 corresponds to the above-described processing (4).

Moreover, if in step S510, it is determined that the first limit-status valid flag is ON, the information processing apparatus 100 sets the first limit-status valid flag to OFF, and sets the second limit-status valid flag to ON (S516). Here, the processing in step S516 corresponds to setting the third setting information for limiting the function (the above-described processing (3)).

Once the second limit-status valid flag is set to ON (the third setting information is set) in step S516, the information processing apparatus 100, based on the second limit-status valid flag, shifts to the second function limit status where the function is limited, corresponding to the third setting information (S518). The information processing apparatus 100 then ends the processing. Here, the processing in step S518 corresponds to the above-described processing (4).

If in step S506, it is determined that the first condition is satisfied, the information processing apparatus 100 determines whether or not the function limit status is valid as in step S112 of FIG. 4 (S520).

If in step S520, it is not determined that the function limit status is valid, it is a status where the power supply capability of the internal power source satisfies the predetermined level and the function is not limited, and thus, the information processing apparatus 100 ends the processing. In the foregoing case, therefore, the information processing apparatus 100 can be driven in a higher-function status where the function is not limited.

If in step S520, it is determined that the function limit status is valid, it is a status where the power supply capability of the internal power source satisfies the predetermined level and the function is limited. The information processing apparatus 100 thus performs the second condition determination processing as in step S114 of FIG. 4 (S522). Here, the processing in step S522 and processing in step S524 described later are the processing for determining whether or not the second condition is satisfied, and correspond to the processing for determining whether or not to release the limit of the function in the information processing apparatus 100 (the above-described processing (2)).

Upon performing the processing (S522), the information processing apparatus 100 determines whether or not the second condition is satisfied as in step S116 of FIG. 4 (S524).

If in step S524, it is not determined that the second condition is satisfied, the information processing apparatus 100 ends the processing. In the foregoing case, since the power supply capability of the internal power source satisfies the predetermined level, but the internal power source is in a status where the limit of the function may not be released, the information processing apparatus 100 maintains the status where the function of the control subject device is limited. Thus, the information processing apparatus 100 can prevent undue load on the internal power source and enhance the safety.

If in step S524, it is determined that the second condition is satisfied, whether or not the second limit-status valid flag is ON is determined (S526). Here, the case where it is determined that the second condition is satisfied is a status where the power supply capability of the internal power source satisfies the predetermined level, and the internal power source is in a status where the limit of the function can be released. Thus, the information processing apparatus 100 releases the limit of the function by processing in steps S528 to S538 described later.

If in steps S526, it is determined that the second limit-status valid flag is ON, the information processing apparatus 100 sets the second limit-status valid flag is set to OFF (S530). Here, since the first limit-status valid flag is in an OFF status, by the processing in step S530, both the first limit-status valid flag and the second limit-status valid flag are turned OFF. Thus, the processing in step S530, for example, corresponds to setting the first setting information that does not allows the function to be limited (the above-described processing (3)). Moreover, in the foregoing case, since the power supply capability of the internal power source satisfies the predetermined level, and the internal power source is in a status where the limit of the function can be released, the information processing apparatus 100 can switch the drive status safely.

Once the second limit-status valid flag is set to OFF in step S530 (the first setting information is set), the information processing apparatus 100 releases the second function limit status where the function is limited, based on the second limit-status valid flag (S530). The information processing apparatus 100 then ends the processing. Here, the processing in step S530 corresponds to the above-described processing (4).

The processing in step S530 allows the information processing apparatus 100 to drive the control subject device in the status where the function of the control subject device is not limited, that is, in the status where the higher functionality can be realized. Accordingly, the information processing apparatus 100 can exert the higher functionality in the driving by the internal power source.

Moreover, if in step S526, it is not determined that the second limit-status valid flag is ON, the information processing apparatus 100 sets the first limit-status valid flag to OFF (S532). Here, since the second limit-status valid flag is OFF, by the processing in step S532, both the first limit-status valid flag and the second limit-status valid flag are turned OFF. Thus, the processing in step S532, for example, corresponds to setting the first setting information that does not allow the function to be limited (the above-described processing (3)). Moreover, in the foregoing case, since the power supply capability of the internal power source satisfies the predetermined level, and the internal power source is in a status where the limit of the function can be released, the information processing apparatus 100 can switch the drive status safely.

Once the first limit-status valid flag is set to OFF in step S532 (the first setting information is set), the information processing apparatus 100 releases the first function limit status where the function is limited, based on the first limit-status valid flag (S534). The information processing apparatus 100 then ends the processing. Here, the processing in step S534 corresponds to the above-described processing (4).

The processing in step S534 allows the information processing apparatus 100 to drive the control subject device in the status where the function of the control subject device is not limited, that is, the status where higher functionality can be realized. Accordingly, the information processing apparatus 100 can exert the higher functionality in the driving by the internal power source.

The information processing apparatus 100 can realize the processings (1) to (4) according to the above-described device control approach, for example, by performing the processing shown in FIGS. 8A, 8B similarly to the processing shown in FIG. 4. Accordingly, by performing the processing shown in FIGS. 8A, 8B, the information processing apparatus 100 can achieve a good balance between the stable driving and the functional enhancement in the case of driving by the power supplied from the internal power source.

Information Processing Apparatus According to the Embodiment of the Present Invention Next, a configuration example of the information processing apparatus 100 according to the embodiment of the present invention that can realize the above-described device control approach according to the embodiment of the present invention is described.

FIG. 9 is an explanatory diagram showing one example of a configuration of the information processing apparatus 100 according to the embodiment of the present invention. The information processing apparatus 100 includes an internal power source 102, a control unit 104, a communication unit 106, a storage unit 108, a display control unit 110, a display unit 112, an operation unit 114, and an external recording medium reading/writing unit 116.

Moreover, the information processing apparatus 100 may include, for example, a ROM (Read Only Memory; not shown), a RAM (Random Access Memory: not shown) and the like. The information processing apparatus 100 can interconnect the respective components, for example, through a bus as a data transmission path. Here, the ROM stores data for control such as programs and arithmetical operation parameters that the control unit 104 uses. The RAM temporarily stores programs to be executed by the control unit 104, and the like.

Hardware Configuration Example of Information Processing Apparatus 100

Figure 10:
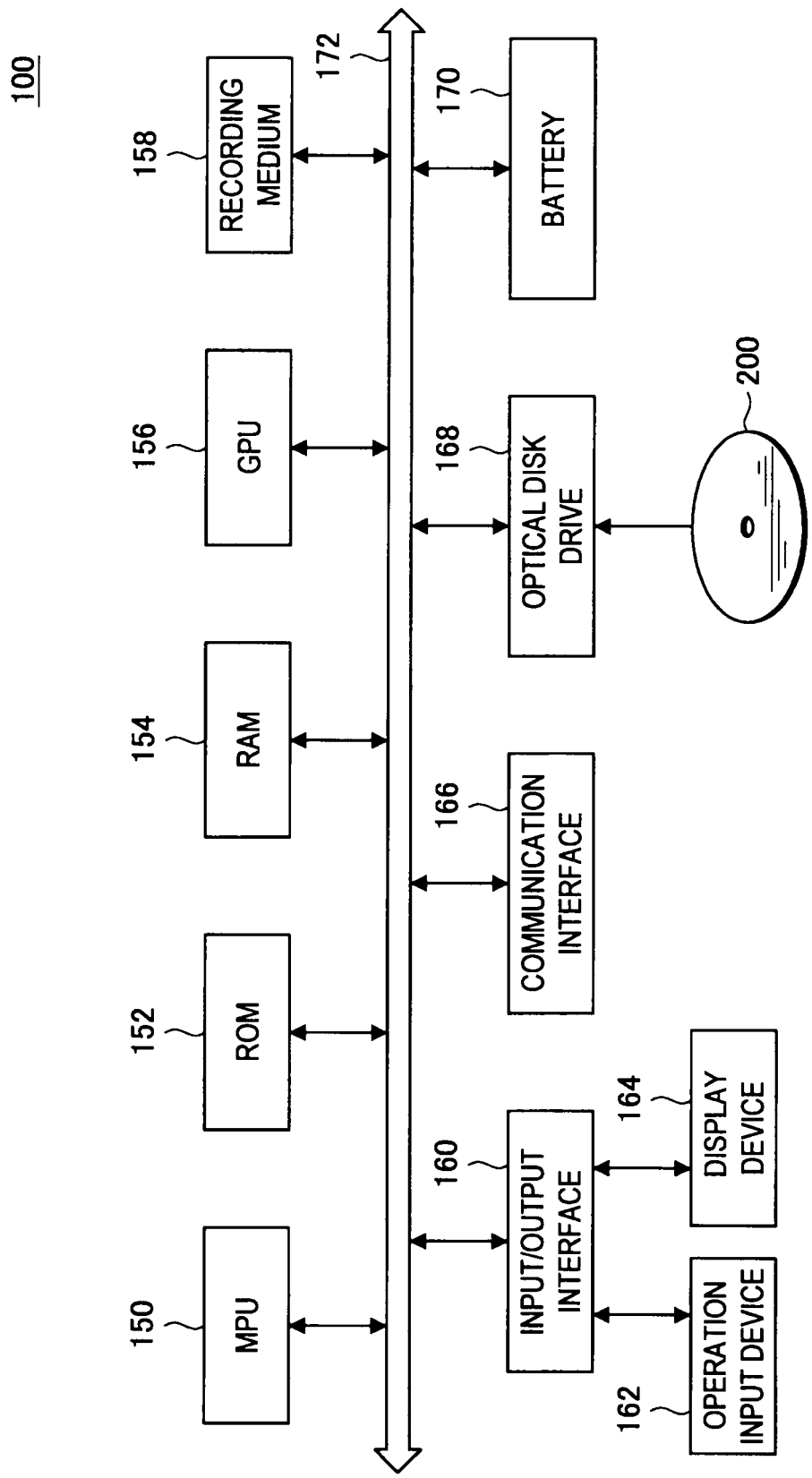
FIG. 10 is an explanatory diagram showing one example of a hardware configuration of the information processing apparatus according to the embodiment of the present invention.

FIG. 10 is an explanatory diagram showing one example of a hardware configuration of the information processing apparatus 100 according to the embodiment of the present invention. Here, in FIG. 10, an optical disk 200 as an external recording medium is shown together. Referring to FIG. 10, the information processing apparatus 100 includes, for example, an MPU 150, a ROM 152, a RAM 154, a GPU 156, a recording medium 158, an input/output interface 160, an operation input device 162, a display device 164, a communication interface 166, an optical disk drive 168, and a battery 170. Moreover, the information processing apparatus 100, for example, interconnects the respective components through a bus 172 as a data transmission path.

The MPU 150 is configured of an MPU, an integrated circuit where a plurality of circuits for realizing a control function are integrated, and the like, and functions as the control unit 104 that controls the overall information processing apparatus 100. Moreover, the MPU 150 can play roles of a power source information acquiring unit 120, a drive status setting unit 122, and a device control unit 124, which will be described later, in the information processing apparatus 100.

The ROM 152 stores the data for control such as the programs and the arithmetical operation parameters that the MPU 150 uses. The RAM 154 temporarily stores, for example, the power source information acquired from the battery 170 (internal power source 102), the programs to be executed by the MPU 150, and the like.

The GPU 156 is configured of a GPU, an integrated circuit where a plurality of circuits for realizing a display function are integrated, and the like, and performs various types of processing according to the display on a display screen of the display unit 112. Moreover, the GPU 156 functions as the display control unit 110.

The recording medium 158 functions as the storage unit 108, and stores, for example, basic software such as an OS and various types of data such as an application. Here, as the recording medium 158, for example, a magnetic recording medium such as a hard disk, and a nonvolatile memory such as an EEPROM (Electrically Erasable and Programmable Read Only Memory), a flash memory, an MRAM (Magnetoresistive Random Access Memory), an FeRAM (Ferroelectric Random Access Memory) and a PRAM (Phase change Random Access Memory) are cited, but the foregoing is not limitative.

The input/output interface 160, for example, connects the operation input device 162 and the display device 164. The operation input device 162 functions as the operation unit 114, and the display device 164 functions as the display unit 112. Here, as the input/output interface 160, for example, a USB (Universal Serial Bus) terminal, a DVI (Digital Visual Interface) terminal, an HDMI (High-Definition Multimedia Interface) terminal and the like are cited, but the foregoing is not limitative. Moreover, the operation input device 162, for example, is provided on the information processing apparatus 100, and is connected to the input/output interface 160 inside the information processing apparatus 100. As the operation input device 162, for example, buttons, a direction key, a rotary selector such as a jog dial, combination of these or the like are cited, but the foregoing is not limitative. Moreover, the display device 164, for example, is provided on the information processing apparatus 100, and is connected to the input/output interface 160 inside the information processing apparatus 100. As the display device 164, for example, an LCD, an organic EL display (organic ElectroLuminescence display or also referred to as an OLED display (Organic Light Emitting Diode display)) and the like are cited, but the foregoing is not limitative. Obviously, the input/output interface 160 can also be connected to an operation input device (e.g., a keyboard, a mouth or the like) and a display device (e.g., an external display or the like) as external apparatuses of the information processing apparatus 100.

The communication interface 166 is a communication means included by the information processing apparatus 100, and functions as the communication unit 106 for performing radio/wired communication with an external apparatus through a network (or directly). Here, as the communication interface 166, for example, a communication antenna and an RF circuit (radio communication), an IEEE802.15.1 port and a transmitting and receiving circuit (radio communication) and an IEEE802.11b port and a transmitting and receiving circuit (radio communication), a LAN terminal and a transmitting and receiving circuit (wired communication) or the like is cited, but the foregoing is not limitative.

The optical disk drive 168 reads the optical disk 200 as the external recording medium, or reads and writes the same. Moreover, the optical disk drive 168 functions as the external recording medium reading/writing unit 116 in the information processing apparatus 100. Here, as the optical disk drive 168, for example, one having a function of reading the optical disk such as a Blu-ray (registered trademark) disk drive, one having a reading function and a writing function such as a DVD-R drive, and the like are cited, but the foregoing is not limitative.

The battery 170 plays a role of the internal power source 102, and supplies voltage for driving the respective components of the information processing apparatus 100. Here, as the battery 170, for example, a secondary battery, such as a lithium-ion secondary battery, including various sensors such as, for example, a temperature sensor, a current sensor and a voltage sensor, and an MPU that generates the power source information based on detection results of the relevant sensors, and the like are cited, but the foregoing is not limitative.

The information processing apparatus 100 realizes the above-described processings (1) to (4), for example, by the configuration shown in FIG. 10. Obviously, the hardware configuration of the information processing apparatus 100 according to the embodiment of the present invention is not limited to the configuration shown in FIG. 10. For example, the information processing apparatus 100 can further include an external power source circuit (not shown) that supplies an external power source to the respective components. Moreover, the information processing apparatus 100 can also have a configuration in which one or more component shown in FIG. 10 is not included, such as a configuration in which the optical disk drive 168 is not included.

Referring again to FIG. 9, the components of the information processing apparatus 100 are described. The internal power source 102 is a power source that the information processing apparatus 10 includes inside. The internal power source 102 plays a role of supplying the power to the respective components of the information processing apparatus 100, for example, when there is no external power source, and the like. In FIG. 9, power supply lines that transmit the power supplied from the internal power source 102 to the respective components are omitted.

Also, the internal power source 102 generates the power source information such as power source supply information and power source demand information at the time of supply of the power. The internal power source 102 transmits the generated power source information to the control unit 104 by the communication with the control unit 104 (strictly speaking, the power source information acquiring unit 120 describe later).

The control unit 104 is configured of, for example, an MPU, an integrated circuit where various circuits such as a cryptography processing circuit are integrated, and the like, and plays a role of controlling the overall information processing apparatus 100. Also, the control unit 104 includes the power source information acquiring unit 120, the drive status setting unit 122, and the device control unit 124, and plays a role of initiatively performing the above-described processings (1) to (4).

The power-source information acquiring unit 120 plays a role of performing the above-described processing (1) (acquisition processing of the power source information from the internal power source), and acquires the power source information from the internal power source 102. More specifically, the power source information acquiring unit 120 communicates with the internal power source 102 through the BIOS and for example, transmits the information acquisition request as shown in FIG. 1 to thereby acquire the power source information from the internal power source 102.

Moreover, the power source information acquiring unit 120 determines the presence and absence of the external power source, and if the external power source is not present, the power source information acquiring unit 120 selectively acquires the power source information from the internal power source 102, but the foregoing is not limitative. In the foregoing case, the power source information acquiring unit 120 plays a role of a drive power source discriminating unit that discriminates whether the information processing apparatus 100 body is driven by the internal power source or driven by the external power source.

The drive status setting unit 122 includes a power supply capability determining unit 130 and a setting unit 132, and the power source information acquiring unit 120 determines the power supply capability of the internal power source 102 based on the power source information that the power source information acquiring unit 120 has acquired from the internal power source 102, and sets the setting information in accordance with the determination result.

The power supply capability determining unit 130 plays a role of performing the above-described processing (2) (determination processing of the power supply capability in the power supply by the internal power source). More specifically, the power supply capability determining unit 130, for example, performs the processings in steps S104, S106 shown in FIG. 4 and the processings in steps S114, S116 shown in FIG. 4, based on the power source information, the first condition shown in FIG. 2, and the second condition shown in FIG. 3.

The setting unit 132 plays a role of performing the above-described processing (3) (setting processing of the setting information). More specifically, the setting unit 132, based on the determination result of the power supply capability determining unit 130, sets the first setting information that does not allow the function of the device to be limited, and the setting information that allows the function of the device to be limited (the second setting information, the third setting information or the like). Here, the setting information set by the setting unit 132, such as the first setting information, the second setting information and the third setting information, is stored, for example, in the storage unit 108, and the setting information stored in the storage unit 108 is updated (recorded) by the setting unit 132 as needed. In the foregoing case, the storage unit 108 plays a role of the setting information storage unit.

The drive status setting unit 122 can play a role of performing the above-described processings (2) and (3) by including the power supply capability determining unit 130 and the setting unit 132.

The device control unit 124 plays a role of performing the above-described processing (4) (drive control processing for the control subject device), and controls the drive status of one or more control subject device, based on the setting information set in the drive status setting unit 122.

The control unit 104 initiatively performs the above-described processings (1) to (4) by including the power source information acquiring unit 120, the drive status setting unit 122 and the device control unit 124.

The communication unit 106 is a communication means included by the information processing apparatus 100, and performs radio/wired communication with an external apparatus through a network (or directly). Moreover, the communication unit 106, for example, is controlled over the communication with the external apparatus by the control unit 104.

The storage unit 108 is a storage means included by the information processing apparatus 100, and stores various types of data, for example, such as the table shown in FIG. 2 on which the first condition is recorded, the table shown in FIG. 3 on which the second condition is recorded, the setting information and the like. Here, as the storage unit 108, for example, a magnetic recording medium such as the hard disk, a non-volatile memory such as a flash memory and the like are cited, but the foregoing is not limitative.

The display control unit 110 is configured of, for example, a GPU, an integrated circuit where a plurality of circuits for realizing the display function are integrated, and the like, and performs various types of processing according to the display on the display screen of the display unit 112. Moreover, the display control unit 110, for example, is controlled over the processing clock and the like by the control unit 104 (more strictly speaking, the device control unit 124).

The display unit 112 is a display means included by the information processing apparatus 100, and displays various types of information on the display screen. As a screen displayed on the display screen of the display unit 112, for example, an operation screen for causing the information processing apparatus 100 to perform a desired operation, and the like are cited. Here, as the display unit 112, for example, an LCD, an organic EL display and the like are cited, but the foregoing is not limitative.

The operation unit 114 is an operation means included by the information processing apparatus 100, which enables an operation by a user. The information processing apparatus 100, by including the operation unit 114, can perform the processing desired by the user. Here, as the operation unit 114, for example, buttons, a direction key, a rotary selector such as a jog dial, combination of these or the like are cited, but the foregoing is not limitative.

The external recording medium reading/writing unit 116, for example, reads data from an external recording medium such as an optical disk and a memory stick, or reads and writes the data. Here, as the external recording medium reading/writing unit 116, for example, an optical disk drive such as a Blu-ray (registered trademark) disk drive and a DVD-R drive, a slot that detachably contains the memory stick and the like, and the like are cited, but the foregoing is not limitative. Moreover, the external recording medium reading/writing unit 116, for example, is controlled over the supplied power and the like by the control unit 104 (more strictly speaking, the device control unit 124).

The information processing apparatus 100 realizes the above-described processings (1) to (4), for example, by the configuration shown in FIG. 9. Accordingly, the information processing apparatus 100 can achieve a good balance between the stable driving and the functional enhancement in the case of driving by the power supplied from the internal power source.

As described above, the information processing apparatus 100 according to the embodiment of the present invention performs the above-described processings (1) (acquisition processing of the power source information from the internal power source) to (4) (drive control processing for the control subject device) to control the control subject device. Here, the information processing apparatus 100 determines the status of the power supply of the internal power source based on the power source information acquired from the internal power source 102, and sets the setting information in accordance with the determination result. The information processing apparatus 100 controls the one or more control subject device, based on the set setting information. More specifically, if it is determined that the power supply capability of the internal power source satisfies the predetermined level, the information processing apparatus 100 sets the first setting information that does not allow the function of the device to be limited, so that the function of the control subject device is not limited (or the function is further enhanced). That is, if it is determined that the power supply capability of the internal power source 102 satisfies the predetermined level, the information processing apparatus 100 further enhances the function. If it is not determined that the power supply capability of the internal power source satisfies the predetermined level, the information processing apparatus 100 sets the setting information that allows the function of the device to be limited (the second setting information, the third setting information or the like), so that the function is limited in accordance with the set setting information. That is, if it is not determined that the power supply capability of the internal power source 102 satisfies the predetermined level, the information processing apparatus 100 reduces the power consumption of the control subject device by limiting the function, thereby preventing the power consumption of the information processing apparatus 100 from exceeding the supply power of the internal power source. Accordingly, the information processing apparatus 100 can achieve a good balance between the stable driving and the functional enhancement in the case of driving by the power supplied from the internal power source.

Modification of Information Processing Apparatus According to the Embodiment of the Present Invention In the foregoing, as the information processing apparatus capable of realizing the device control approach according to the embodiment of the present invention, the information processing apparatus 100 shown in FIG. 9 has been described. However, the configuration of the information processing apparatus according to the embodiment of the present invention is not limited to the configuration shown in FIG. 9. Consequently, next, a configuration of another information processing apparatus capable of realizing the device control approach according to the embodiment of the present invention is described.

Figure 11:
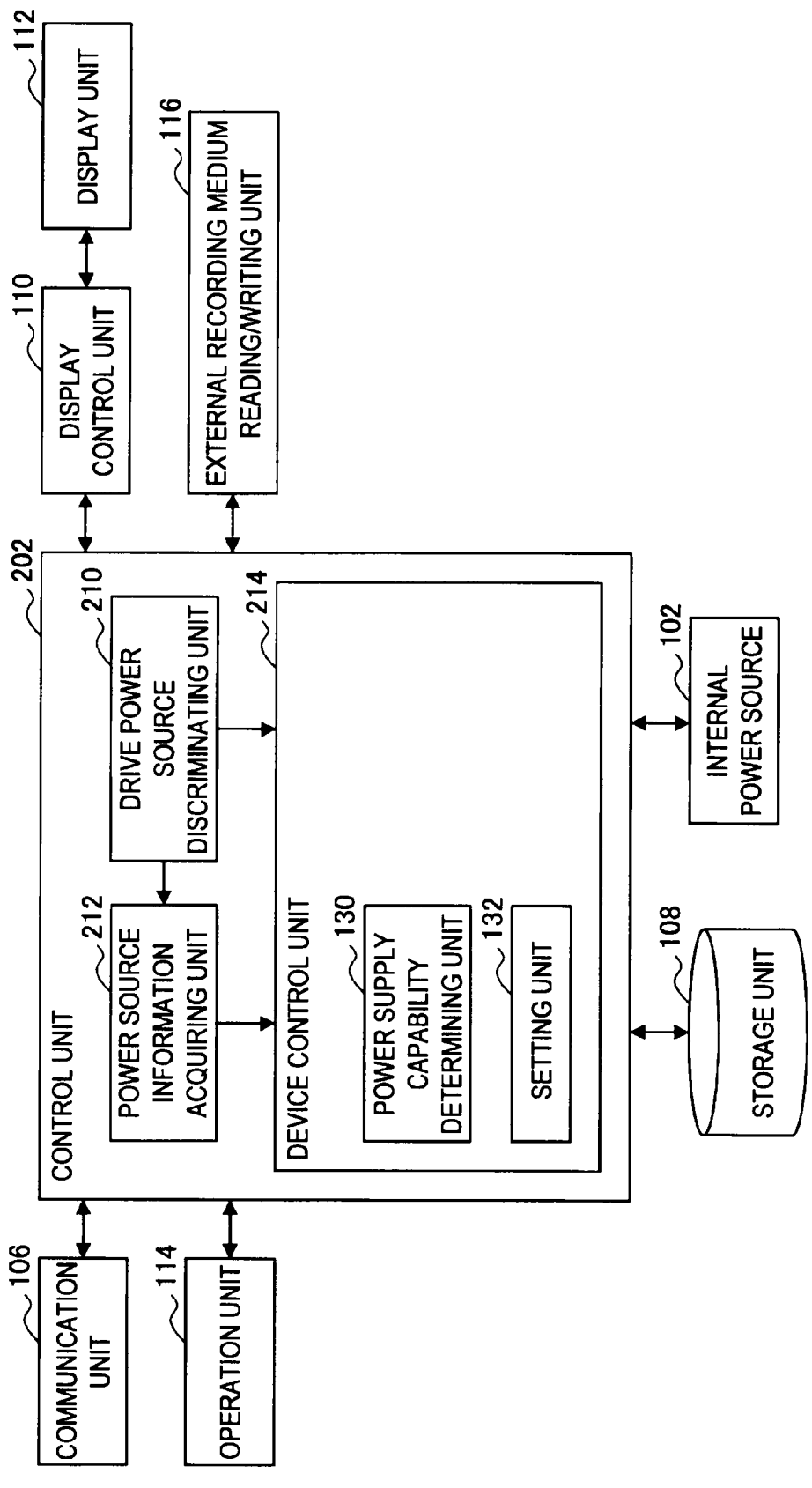
FIG. 11 is an explanatory diagram showing one example of a configuration of an information processing apparatus according to a modification of the embodiment of the present invention.

FIG. 11 is an explanatory diagram showing one example of a configuration of an information processing apparatus 300 according to a modification of the embodiment of the present invention.

The information processing apparatus 300 includes the internal power source 102, a control unit 202, the communication unit 106, the storage unit 108, the display control unit 110, the display unit 112, and the external recording medium reading/writing unit 116. Moreover, the information processing apparatus 300 can take a hardware configuration similar to that of the information processing apparatus 100 (e.g., the configuration of FIG. 10). Here, the information processing apparatus 300 basically has a configuration similar to that of the information processing apparatus 100 shown in FIG. 9, and a different point between the information processing apparatus 300 and the information processing apparatus 100 lies in a configuration of the control unit. Hereinafter, a configuration of the control unit 202 is described and explanations of the other configurations are omitted.

The control unit 202 includes a drive power source discriminating unit 210, a power source information acquiring unit 212 and a device control unit 214.

The drive power source discriminating unit 210 discriminates whether the information processing apparatus 300 body is driven by the internal power source 102 or is driven by an external power source (not shown). If the drive power source discriminating unit 210 discriminates driving by the internal power source, the drive power source discriminating unit 210 transmits, to the power source information acquiring unit 212 and the device control unit 214, an internal-power-source drive signal indicating that the information processing apparatus 300 is driven by the internal power source. Transmitting the internal-power-source drive signal allows the power source information acquiring unit 212 to selectively acquire the power source information such as the power source supply information and the power source demand information from the internal power source 102 in accordance with the internal-power-source drive signal. Also, transmitting the internal-power-source drive signal allows the device control unit 214 to selectively control the device in accordance with the internal-power-source drive signal. That is, the drive power source discriminating unit 210 plays a role of generating the signal (internal-power-source drive signal), which serves as a trigger for starting the processing according to the device control approach according to the embodiment of the present invention in the information processing apparatus 300.

The power source information acquiring unit 212 plays a role of performing the above-described processing (1) (acquisition processing of the power source information from the internal power source) similarly to the power-source information acquiring unit 120 of the information processing apparatus 100 shown in FIG. 9 to acquire the power source information from the internal power source 102. More specifically, the power source information acquiring unit 212 communicates with the internal power source 102 through the BIOS in accordance with the transmission of the internal-power-source drive signal from the drive power source discriminating unit 210, and for example, sends the information acquisition request as shown in FIG. 1 to acquire the power source information from the internal power source 102.

The device control unit 214 controls the drive status of the device, for example, based on the power source information such as the power source supply information and the power source demand information acquired by the power source information acquiring unit 212, and the setting information stored in the storage unit 108 (setting information storage unit). Here, the device control unit 214 includes the power supply capability determining unit 130 and the setting unit 132 having functions similar to those of the power supply capability determining unit 130 and the setting unit 132 of the information processing apparatus 100 shown in FIG. 9. That is, the device control unit 214 has both the functions of the drive status setting unit 122 and the device control unit 124 of the information processing apparatus 100 shown in FIG. 9. Accordingly, the device control unit 214 plays a role of performing the above-described processings (2) (determination processing of the power supply capability in the power supply by the internal power source to (4) (drive control processing for the control subject device).

As described above, the control unit 202 of the information processing apparatus 300 includes the drive power source discriminating unit 210, the power source information acquiring unit 212 and the device control unit 214. Here, the combination of the drive power source discriminating unit 210 and the power source information acquiring unit 212 corresponds to the power source information acquiring unit 120 of the information processing apparatus 100 shown in FIG. 9. Moreover, the device control unit 214 corresponds to the combination of the drive status setting unit 122 and the device control unit 124 of the information processing apparatus 100 shown in FIG. 9. Accordingly, the control unit 202 can initiatively perform the above-described processings (1) to (4), similarly to the control unit 104 of the information processing apparatus 100 shown in FIG. 9.

As described above, in the information processing apparatus 300 according to the modification, while the configuration of the control unit 202 is different from the control unit 104 according to the information processing apparatus 100 shown in FIG. 9, the information processing apparatus 300 controls the control subject device by performing the above-described processings (1) to (4). Accordingly, the information processing apparatus 300 according to the modification can achieve a good balance between the stable driving and the functional enhancement in the case of driving by the power supplied from the internal power source as in the information processing apparatus 100 shown in FIG. 9.

The configuration of the information processing apparatus capable of realizing the device control approach according to the embodiment of the present invention is not limited to those of the information processing apparatus 100 shown in FIG. 9, and the information processing apparatus 300 shown in FIG. 11.

While in the foregoing, the information processing apparatuses 100, 300 are cited and described as the embodiment of the present invention, the embodiment of the present invention is not limited to these. The embodiment of the present invention can be applied to various types of equipment each of which can be driven by an internal power source, for example, a computer such as a laptop PC, a portable communication apparatus such as a portable telephone and a PHS (Personal Handyphone System), a video/music reproduction apparatus such as WALK MAN (registered trademark), a portable game machine such as PlayStation Portable (registered trademark), a display apparatus such as an LCD, and the like.

Program According to the Embodiment of the Present Invention

A program for causing a computer to function as the information processing apparatus according to the embodiment of the present invention can bring about a good balance between the stable driving and the functional enhancement in the case of driving by the power supplied from the internal power source.

It should be understood by those skilled in the art that various modifications, combinations, sub-combinations and alterations may occur depending on design requirements and other factors insofar as they are within the scope of the appended claims or the equivalents thereof.

While in the foregoing, for example, providing a program (computer program) for causing the computer to function as the information processing apparatuses 100 or the information processing apparatuses 300 has been described, the embodiment of the present invention can further provide a storage medium in which the foregoing program is stored, as well.

The above-mentioned configurations represent exemplary embodiments of the present invention, of course belonging to the technical scope of the present invention.

The present application contains subject matter related to that disclosed in Japanese Priority Patent Application JP 2008-335251 filed in the Japan Patent Office on Dec. 26, 2008, the entire content of which is hereby incorporated by reference.

What is claimed is:

1. An information processing apparatus, comprising:
an internal power source that supplies power;
a power source information acquiring unit that acquires, from the internal power source, power source information relating to supply of the power in the internal power source;
a drive status setting unit that determines power supply capability of the internal power source based on the power source information, and sets setting information to define a drive status of a device in accordance with a determination result; and
a device control unit that controls the drive status of one or more control subject devices, based on the setting information, wherein
the drive status setting unit includes
a power supply capability determining unit that determines whether or not a first condition for determining the power supply capability in the internal power source is satisfied based on the power source information; and
a setting unit that selectively sets first setting information that does not allow a function of the device to be limited or second setting information that allows the function of the device to be limited, based on a determination result relating to the first condition in the power supply capability determining unit,
the power supply capability determining unit further determines whether or not a second condition for releasing the limit of the function of the device is satisfied, based on the power source information, if the first condition is satisfied, and if the second setting information is set, and
the setting unit sets the first setting information in place of the second setting information, based on a determination result relating to the second condition in the power supply capability determining unit.

2. The information processing apparatus according to claim 1, wherein
the device control unit controls the one or more control subject devices by a first drive status where the function of the one or more devices is not limited, if the first setting information is set, and
the device control unit controls the one or more control subject devices by a second drive status where the function of the one or more devices is limited in accordance with the second setting information, if the second setting information is set.

3. The information processing apparatus according to claim 1, wherein
the setting unit sets the first setting information, if it is determined in the power supply capability determining unit that the first condition is satisfied, and
the setting unit sets the second setting information, if it is not determined in the power supply capability determining unit that the first condition is satisfied.

4. The information processing apparatus according to claim 3, wherein
the setting unit sets third setting information that allows the function of the device to be limited more than the second setting information does, in place of the second setting information, if it is not determined in the power supply capability determining unit that the first condition is satisfied, and if the second setting information is set, and
the device control unit controls the one or more control subject devices by a third drive status where the function of the one or more devices is limited in accordance with the third setting information, if the third setting information is set.

5. The information processing apparatus according to claim 1, wherein
the power supply capability determining unit does not determine that the second condition is satisfied before a predetermined time has passed since the drive status of the one or more control subject devices was switched.

6. An information processing apparatus, comprising:
an internal power source that supplies power to an apparatus body;
a power source information acquiring unit that acquires, from the internal power source, power source supply information that varies in accordance with a power supply status of the internal power source, and power source demand information of a device that varies in accordance with a drive status of the device;
a setting information storage unit that stores setting information to define a drive condition of the device;
a device control unit that controls the drive status of the device based on the power source supply information, the power source demand information, and the setting information; and
a drive power source discriminating unit that discriminates whether or not the apparatus body is driven by the internal power source, or driven by an external power source, wherein
the device control unit controls the drive status of the device, based on the power source supply information, the power source demand information, and the setting information, if it is determined in the drive power source discriminating unit that the apparatus body is driven by the internal power source, and
the device control unit includes
a power supply capability determining unit that determines whether or not a first condition for determining power supply capability in the internal power source is satisfied based on the power source supply information and the power source demand information and
a setting unit that selectively sets first setting information that does not allow a function of the device to be limited or second setting information that allows the function of the device to be limited, based on a determination result relating to the first condition in the power supply capability determining unit.

7. The information processing apparatus according to claim 6, wherein
the power supply capability determining unit further determines whether or not a second condition for releasing the limit of the function of the device is satisfied, based on the power source supply information and the power source demand information, if the first condition is satisfied, and if the second setting information is set, and
the setting unit sets the first setting information in place of the second setting information, based on a determination result relating to the second condition in the power supply capability determining unit.

8. A device control method comprising:
acquiring, from an internal power source, power source information relating to supply of power in the internal power source that supplies the power;
determining power supply capability of the internal power source based on the power source information;
setting information to define a drive status of a device in accordance with a determination result in the step of determining; and
controlling the drive status of one or more control subject devices based on the set setting information, wherein
the determining further includes determining whether or not a first condition for determining the power supply capability in the internal power source is satisfied based on the power source information,
the setting further includes selectively setting first setting information that does not allow a function of the device to be limited or second setting information that allows the function of the device to be limited, based on a determination result relating to the first condition,
the determining further includes determining whether or not a second condition for releasing the limit of the function of the device is satisfied, based on the power source information, if the first condition is satisfied, and if the second setting information is set, and
the setting further includes setting the first setting information in place of the second setting information, based on a determination result relating to the second condition.

9. A device control method, comprising:
acquiring, from an internal power source, power source supply information that varies in accordance with a power supply status of the internal power source that supplies power to an apparatus body, and power source demand information of a device that varies in accordance with a drive status of the device;
storing setting information to define a drive condition of the device;
controlling the drive status of the device based on the power source supply information, the power source demand information, and the setting information;
discriminating whether or not the apparatus body is driven by the internal power source, or driven by an external power source, wherein
the controlling further includes controlling the drive status of the device, based on the power source supply information, the power source demand information, and the setting information, if it is determined in the discriminating that the apparatus body is driven by the internal power source,
the controlling further includes determining whether or not a first condition for determining power supply capability in the internal power source is satisfied based on the power source supply information and the power source demand information, and
the controlling further includes selectively setting first setting information that does not allow a function of the device to be limited or second setting information that allows the function of the device to be limited, based on a determination result relating to the first condition.

* * * * *